(12) United States Patent
Green et al.

(10) Patent No.: US 7,234,707 B2
(45) Date of Patent: Jun. 26, 2007

(54) INTEGRATED CONTROL UNIT FOR AN ACTIVE ROLL CONTROL SYSTEM FOR A VEHICLE SUSPENSION SYSTEM

(75) Inventors: Steve J. Green, Clarkson, MI (US); Greg Campau, Plymouth, MI (US); Harry Hunnicutt, Ann Arbor, MI (US)

(73) Assignee: Kelsey-Hayes Company, Livonia, MI (US)

( * ) Notice: Subject to any disclaimer, the term of this patent is extended or adjusted under 35 U.S.C. 154(b) by 134 days.

(21) Appl. No.: 11/000,319

(22) Filed: Nov. 30, 2004

(65) Prior Publication Data

US 2005/0146098 A1 Jul. 7, 2005

Related U.S. Application Data

(63) Continuation of application No. PCT/US03/17476, filed on May 30, 2003.

(60) Provisional application No. 60/385,421, filed on May 31, 2002.

(51) Int. Cl.
*B60G 11/26* (2006.01)
*B60G 17/015* (2006.01)
*B60G 17/09* (2006.01)
*B60G 17/0195* (2006.01)

(52) U.S. Cl. ............................ 280/5.511; 280/5.508; 280/124.157; 280/124.16; 280/5.51; 137/884

(58) Field of Classification Search ............ 280/5.508, 280/5.509, 5.51, 5.511, 124.157, 124.16, 280/124.161; 137/884

See application file for complete search history.

(56) References Cited

U.S. PATENT DOCUMENTS

| | | | |
|---|---|---|---|
| 4,898,360 A | 2/1990 | VonHayn et al. | |
| 5,137,299 A | 8/1992 | Jones | |
| 5,145,206 A | 9/1992 | Williams | |
| 5,289,379 A | 2/1994 | Williams | |
| 5,295,074 A | 3/1994 | Williams | |
| 5,510,986 A | 4/1996 | Williams | |
| 5,529,324 A | 6/1996 | Krawczyk et al. | |
| 5,590,898 A | 1/1997 | Williams et al. | |
| 5,597,180 A | 1/1997 | Ganzel | |
| 5,619,413 A | 4/1997 | Oakley | |
| 5,630,623 A | 5/1997 | Ganzel | |
| 5,941,282 A * | 8/1999 | Suzuki et al. | 137/884 |
| 6,149,166 A | 11/2000 | Struss et al. | |
| 6,175,792 B1 | 1/2001 | Jones et al. | |
| 6,179,310 B1 | 1/2001 | Clare et al. | |
| 6,259,982 B1 | 7/2001 | Williams et al. | |
| 6,264,212 B1 * | 7/2001 | Timoney | 280/5.51 |
| 6,520,510 B1 * | 2/2003 | Germain et al. | 280/5.511 |

(Continued)

*Primary Examiner*—Ruth Ilan
(74) *Attorney, Agent, or Firm*—MacMillan, Sobanski & Todd, LLC

(57) ABSTRACT

An Active Roll Control System for a motor vehicle that utilizes small valves to control large flows. Flow is supplied by a hydraulic pump which is powered in some fashion by the motor vehicle. Flow is directed to the actuators by a three-position-four-way valve that is controlled by two pairs of small ABS style solenoid valves. This allows for a minimum of power to be supplied by the vehicle to operate the system. Also, this valve arrangement allows a desirable failure mode whereby hydraulic fluid is locked into the hydraulic actuators, there by locking in the anti-roll bar in case of a system failure.

11 Claims, 21 Drawing Sheets

U.S. PATENT DOCUMENTS 6,662,881 B2 * 12/2003 Domann .................... 172/272
6,669,216 B1 * 12/2003 Elser et al. ........... 280/124.106
6,874,756 B2 * 4/2005 Hawkins et al. ............ 251/291
7,055,832 B2 * 6/2006 Germain .................. 280/5.508

* cited by examiner

| Embodiment | Valve type | Valve group | Power state Straight ahead | Power state Left turn | Power state Right turn |
|---|---|---|---|---|---|
| A | Normally closed | a | On | On | Off |
|   | Normally closed | b | On | Off | On |
| B | Normally open | a | Off | Off | On |
|   | Normally open | b | Off | On | Off |
| C | Normally open | a | Off | Off | On |
|   | Normally closed | b | On | Off | On |

FIG.6

INTEGRATED CONTROL UNIT FOR AN ACTIVE ROLL CONTROL SYSTEM FOR A VEHICLE SUSPENSION SYSTEM

CROSS REFERENCE TO RELATED APPLICATIONS

This application is a continuation of International Application No. PCT/US03/17476, filed May 30, 2003, which claims the benefit of U.S. Provisional Patent Application No. 60/385,421, filed May 31, 2002. The disclosures of both applications are incorporated herein by reference.

BACKGROUND OF THE INVENTION

This invention relates in general to vehicle suspension systems and in particular to an integrated control unit for an active roll control system.

Vehicle suspension systems control chassis motion during operation of the vehicle in order to isolate the vehicle load from irregularities in the terrain over which the vehicle travels. One such chassis motion, that is controlled by know suspension systems, is chassis roll. A vehicle experiences chassis roll during a turning maneuver. During chassis roll, the chassis tilts or "rolls" about the vehicle's fore-to-aft axis toward an outside direction of the turn.

In the past, vehicles have been provided with passive suspension systems that normally include a spring and damper connected between sprung and unsprung portions of the vehicle. Accordingly, a spring and damper is typically provided for each vehicle wheel. Passive suspension systems are generally self-contained and only react to loads applied to them.

More recently, active suspension systems have been developed that apply positive reactions to applied loads. Active suspension systems typically include hydraulic or pneumatic actuators that are coupled to the passive suspension system components. A typical prior art active suspension system with a roll control system 10 is illustrated in FIG. 1. The roll control system 10 includes an Electronic Control Unit (ECU) 12 that is in electrical communication with at least one wheel speed sensor 14, a lateral accelerometer 16 and a steering angle detector 18 that together provide a means for sensing forces that cause the vehicle to roll. The roll control system 10 also includes a front anti-roll bar 20 and a front cylinder and piston assembly 22 associated with the vehicle front wheels 24. Similarly, a rear anti-roll bar 25 and a rear cylinder and piston assembly 26 are associated with the rear wheels 28. The front and rear anti-roll bars 20 and 25 are connected to the vehicle body (not shown) and, via the front and rear cylinder and piston assemblies 22 and 26 and a strut 30a, or via a strut 30b, to the vehicle wheels at pairs of suspension arms 24a and 28a associated with the front and rear wheels 24 and 28, respectively. A pump 32 has an intake port connected by a first hydraulic line to a fluid reservoir 34 and a discharge port connected by a second hydraulic line to a fluid control device 36. The fluid control device 36 is connected by other hydraulic lines to the front and rear cylinder and piston assemblies 22 and 26.

A fluid schematic drawing for the roll control system 10 is shown in FIG. 2 where components that are similar to components shown in FIG. 1 have the same numerical designators. As shown in FIG. 2, the pump 32 also supplies hydraulic fluid to a power steering valve assembly 52. Indeed, because so many vehicles are equipped with power steering, the power steering pump is typically used to supply pressurized hydraulic fluid to both the power steering valve assembly 52 and the roll control system 10, as shown in FIG. 2. Hydraulic fluid flows from the power steering valve assembly 52 to a pressure differential valve 54 that can establish a pressure differential thereacross to supply pressurized hydraulic fluid to the roll control system fluid control device 36. A check valve 56 prevents back flow of hydraulic fluid from the control device 36 to the power steering valve assembly 52. A relief valve 58 that bypasses the pressure differential valve 54 protects the power steering valve assembly 52 from excessive fluid pressures that may develop in the roll control system 10.

As shown in FIG. 2, the fluid control device 36 includes a three position solenoid actuated control valve 37 that is operative to apply pressurized hydraulic fluid to one side of the pistons contained in the cylinder and piston assemblies 22 and 26 while venting hydraulic fluid from the other side of the pistons. Operation of the control valve 37 causes each of the pistons to move in a selected axial direction within its associated cylinder. As the vehicle is driven along a straight line, the control device 36 is not actuated. When not actuated, as illustrated in FIG. 2, the control valve 37 connects both sides of the pistons directly to the fluid reservoir 34. As a result, the cylinder and piston assemblies 22 and 25 approach equilibrium with the pistons "floating" within their respective cylinders.

During operation of the vehicle, the ECU 12 receives input signals from the wheel speed sensor 14, the lateral accelerometer 16 and the steering angle detector 18. The ECU 12 processes the input signals to determine any roll of the vehicle relative to the wheels 24 and 28. Based upon the determination, the ECU 12 activates the fluid control device 36 to supply pressurized hydraulic fluid to one end of the cylinder and piston assemblies 24 and 26. In response, the pistons move axially within the cylinders to input a torque through the anti-roll bars 20 and 25 to cancel the roll of the vehicle. For example, when the shuttle in the valve 37 is shifted to the right in FIG. 2, the pistons are urged in a downward axial direction. Conversely, when the shuttle is shifted to the left in FIG. 2, the pistons are urged in an upward direction.

Additional details of the roll control system 10 shown in FIGS. 1 and 2 are included in U.S. Pat. No. 5,529,324, which is incorporated herein by reference.

SUMMARY

This invention relates to an integrated control unit for an active roll control system.

It is apparent that the roll control system 10 described above is rather complex and includes components positioned in separated locations throughout the vehicle. The separation of the components can complicate trouble shooting and maintenance of the system 10. Accordingly, it would be desirable to consolidate the components of the system into one central location. Also, it would be desirable to utilize available hardware components in the roll control system 10 to reduce the inventory carried by manufacturers and service centers.

The present invention contemplates a control unit for a roll control system for a vehicle suspension system, the control unit that includes a valve body that is adapted to be connected to a roll control actuator device. A plurality of valves are mounted upon the valve body with the valves operable to control the roll control actuator device. A housing is removeably attached to the valve body and electronic components are disposed within the housing that are operable to selectively operate the valves.

The control unit also include a circuit substrate carrying the electronic components mounted within the housing. It is further contemplated at least one of the valves mounted upon the valve body is a solenoid valve and that a solenoid coil associated with the solenoid valve is carried by the circuit substrate. The solenoid coil being selectively energized by the electronic components to actuate the corresponding solenoid valve.

In the preferred embodiment the control unit includes a three-position four-way valve mounted upon the valve body that is adapted to be connected the roll control actuator device. The three-position four-way valve is operable to selectively actuate the roll control actuator device to counter vehicle roll. Additionally, the control unit includes two pairs of digital solenoid valves mounted upon the valve body. Each of the valve pairs includes a normally open valve and a normally valve and is associated with one position of the three-position four-way valve. Each of the valve pairs is selectively operable to change the position of said three-position four-way valve.

The invention also contemplates a method for controlling the roll of a vehicle comprising the steps of providing a roll control system the includes a valve body that is adapted to be connected to a roll control actuator device. The valve body having a plurality of valves mounted thereon with the valves operable to control the roll control actuator device. A housing having electronic components disposed therein is removeably attached to the valve body. The electronic components are electrically connected to at least one sensor for detecting roll of the vehicle about a fore to aft axis and are operable to selectively actuate said valves. The valves are selectively actuated upon detection of a vehicle roll to counteract the vehicle roll. Then the valves are deactuated detection that the vehicle roll has ended.

Various objects and advantages of this invention will become apparent to those skilled in the art from the following detailed description of the preferred embodiment, when read in light of the accompanying drawings.

BRIEF DESCRIPTION OF THE DRAWINGS

FIG. 6 is a table that summarizes the operation of the valves utilized in the roll control system shown in FIG. 5.

DETAILED DESCRIPTION OF THE PREFERRED EMBODIMENT

Figure 1:
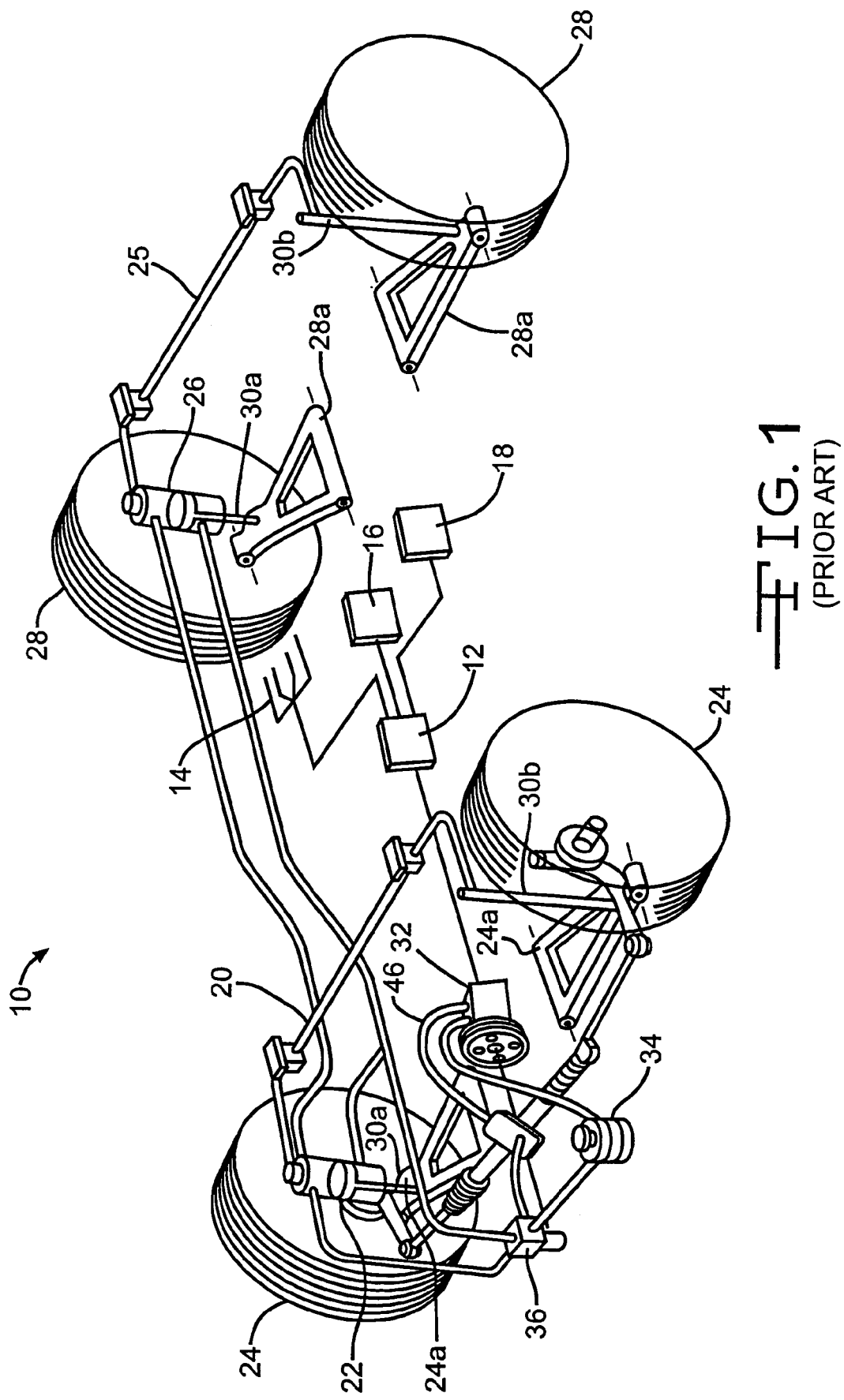
FIG. 1 is a schematic drawing of a known roll control system for a vehicle suspension system.
Figure 2:
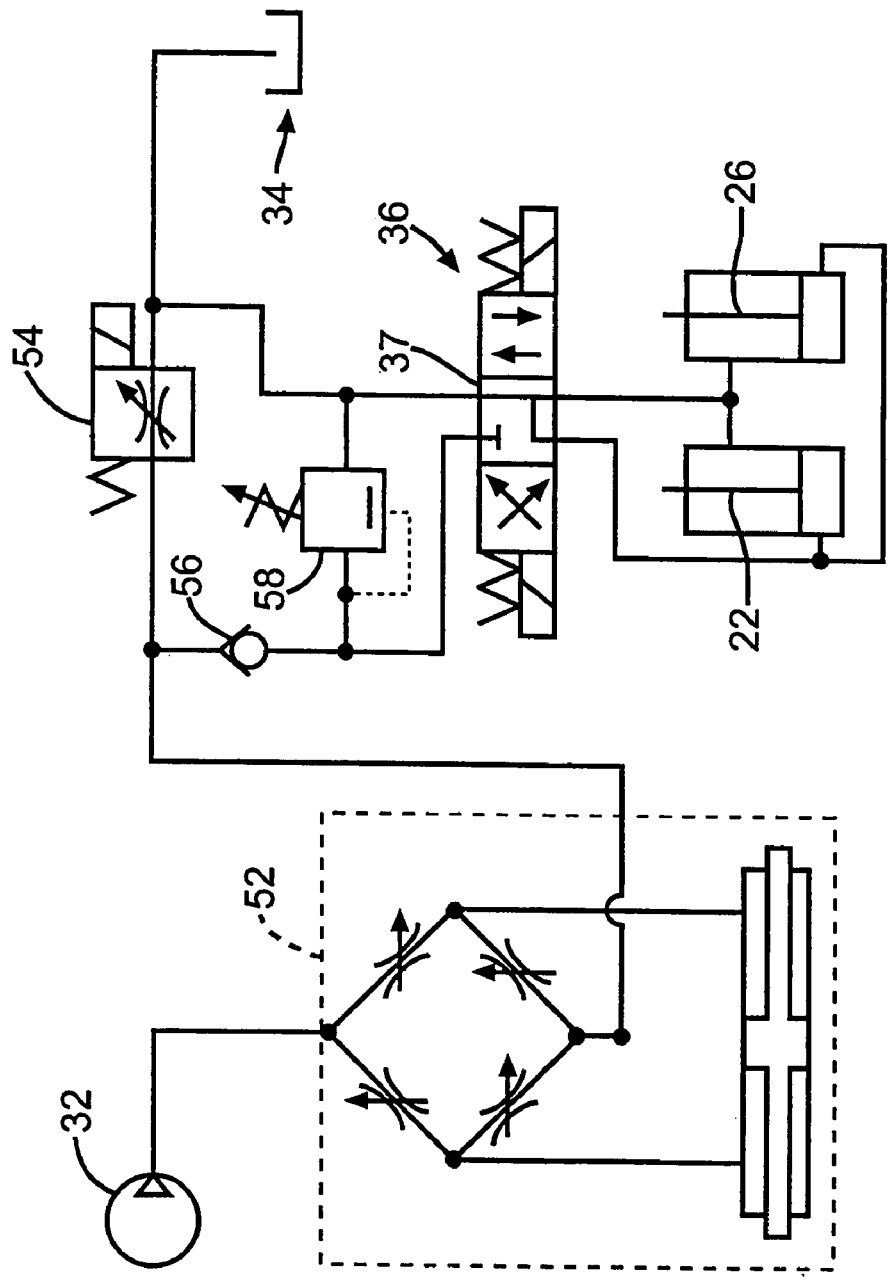
FIG. 2 is a fluid schematic drawing for the roll control system shown in FIG. 1.
Figure 3:
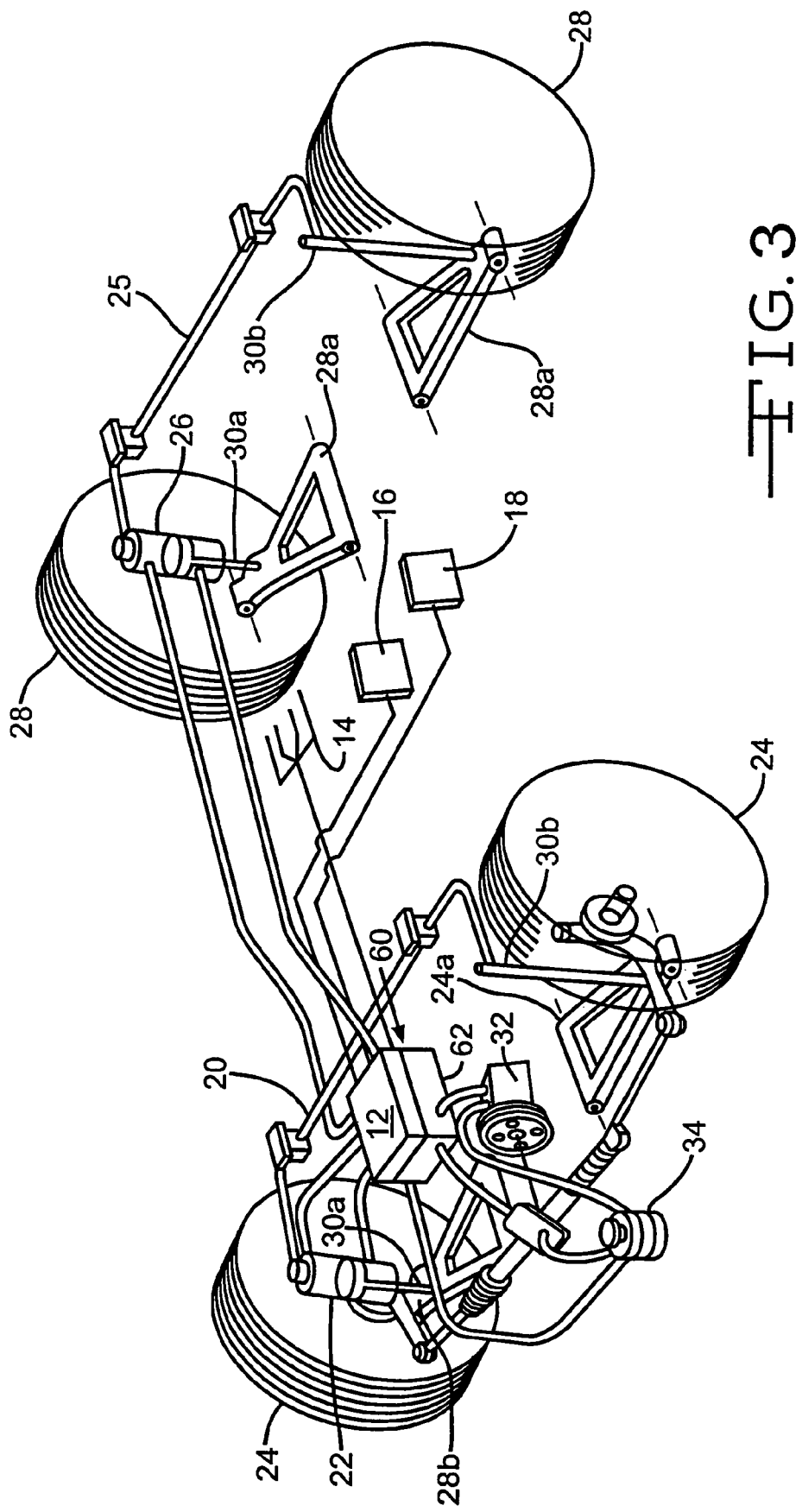
FIG. 3 is a schematic drawing for a suspension roll control system that includes an integrated control unit in accordance with the present invention.
Figure 4:
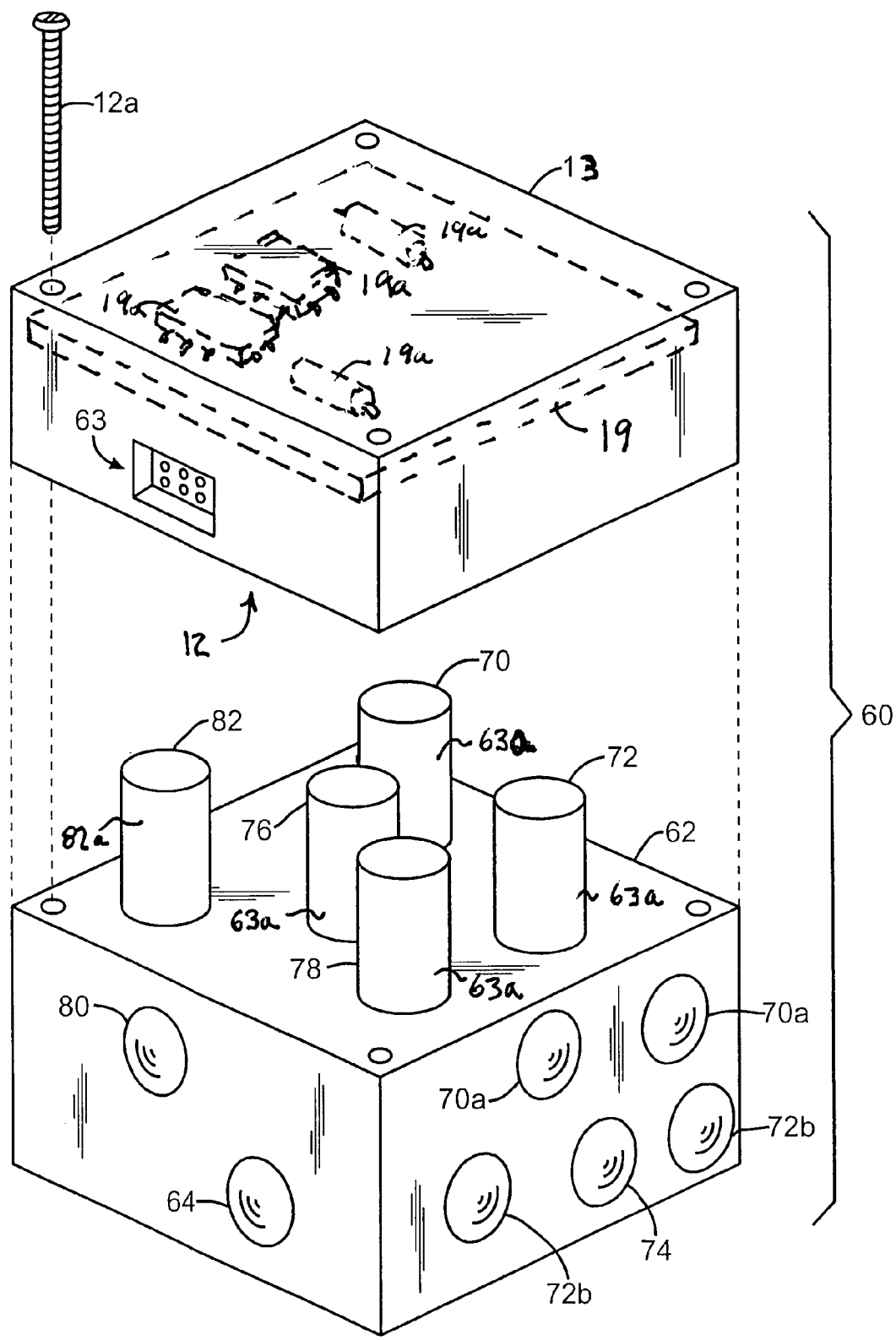
FIG. 4 is an exploded perspective drawing of the integrated control unit used in the roll control system shown in FIG. 3.

Referring now to the drawings, there is illustrated in FIG. 3 an integrated control unit 60 for an Active Roll Control (ARC) system for a vehicle suspension system. Components shown in FIG. 3 that are similar to components shown in FIG. 1 have the same numerical identifiers. The integrated control unit 60 includes the ECU 12 described above; however, the ECU 12 is disposed within a housing 13 that is removably attached to a hydraulic valve body 62 by a plurality of threaded fasteners 12a (one shown), as illustrated in FIG. 4. A seal (not shown) extends around the perimeter of the bottom of the ECU housing 13 and forms a seal with the top surface of the hydraulic valve body 62 when the ECU 12 is mounted thereon. The ECU 12 is electrically connected by an electrical connector 63 carried by the housing 13 to the wheel speed sensor 14, the lateral accelerometer 16 and the steering angle detector 18. A printed circuit board (not shown) or circuit substrate 19 (schematically shown in phantom in FIG. 4) is carried within the ECU housing 13. Electronic components 19a (also shown schematically in phantom in FIG. 4), including a microprocessor for controlling the roll control system, are mounted upon the printed circuit board or substrate.

The hydraulic valve body 62 carries a plurality of solenoid valves that operate the roll control system. The armatures of the valves are enclosed within cylindrical sleeves 63a that extend in an upward direction from the top surface of the hydraulic valve body 62, as shown in FIG. 4. Solenoid coils (not shown) for activation of the valves are carried upon the lower surface of the printed circuit board that is carried by the ECU housing 13. When the ECU 12 is attached to the hydraulic valve body 62, each solenoid coil receives a corresponding valve sleeve. When the microprocessor causes a voltage to be applied to one of the solenoid coils to energize the coil, the corresponding valve is actuated.

The ECU 12 is removable from the hydraulic valve body 62 to facilitate maintenance. The invention contemplates that the hydraulic circuit for the roll control unit 60 remains sealed by the valve sleeves 63a when the ECU 12 is removed from the valve body 62, thus avoiding the need to purge air from the system during reassembly. Additionally, it is possible to install a replacement ECU 12 and return the original ECU to a central location for servicing, thus reducing the time needed to repair the vehicle.

The hydraulic valve body 62 is connected by hydraulic lines to the pump 32 and hydraulic fluid reservoir 34. The hydraulic valve body 62 also is connected by other hydraulic lines to the front and rear cylinder and piston assemblies 22 and 26. Thus, the integrated control unit 60 provides a single centralized assembly for the roll control system.

Figure 5A:
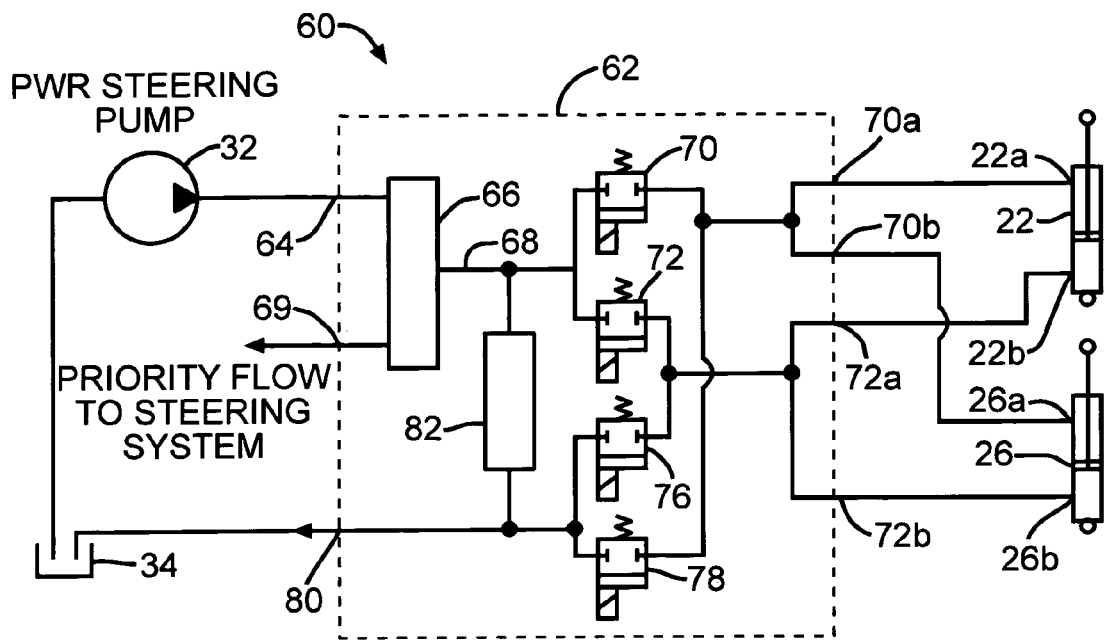
FIG. 5A is a fluid schematic drawing for the roll control system shown in FIG. 3.

As shown in FIG. 5A, the discharge of the pump 32 is connected by a hydraulic line to an input port 64 for the hydraulic valve body 62. A priority flow valve 66 is mounted within the hydraulic valve body 62 and divides the supply of hydraulic fluid between a passageway 68 formed within the valve body 62 and a first discharge port 69. The internal passage way 68 communicates with input ports of first and second normally closed digital solenoid valves 70 and 72 while the first discharge port 69 is connected to the vehicle power steering control valve (not shown). Both the first and second solenoid valves 70 and 72 are shown with deenergized solenoid coils in FIG. 5A.

The discharge port of the first digital solenoid valve 70 is connected by internal passageways formed within the hydraulic valve body 62 to a pair of discharge ports 70a and 70b. The discharge ports 70a and 70b are connected by hydraulic lines to upper ports 22a and 26a formed in the front and rear cylinder and piston assemblies 22 and 26, respectively. Similarly, the discharge port of the second digital solenoid valve 72 is connected by internal passageways formed within the hydraulic valve body 62 to a pair of discharge ports 72a and 72b. The discharge ports 72a and 72b are connected by hydraulic lines to lower ports 22b and 26b formed in the front and rear cylinder and piston assemblies 22 and 26, respectively.

The discharge port of the second digital solenoid valve 72 also is connected by an internal passageway formed in the hydraulic valve body 62 to an input port of a third normally closed digital solenoid valve 76. Similarly, the discharge port of the first digital solenoid valve 70 is connected by an internal passageway formed in the hydraulic valve body 62 to an input port of a fourth normally closed digital solenoid valve 78. Both the third and fourth solenoid valves 76 and 78 are shown with deenergized solenoid coils in FIG. 5A.

Because of the internal passageways within the valve body 62, the input port of the third valve 76 also is connected to the lower ports 22b and 26b of the front and rear cylinder and piston assemblies 22 and 26, as illustrated in FIG. 5A. Similarly, the input port of the fourth valve 78 also is connected to the upper ports 22a and 26a of the front and rear cylinder and piston assemblies 22 and 26. The discharge ports of the third and fourth digit solenoid valves 76 and 78 are connected by internal passageways within the hydraulic valve body 62 to a second discharge port 80. The second discharge port is connected by a hydraulic line to the reservoir 34.

A pressure control valve 82 is connected across the input ports of the first and second digital solenoid valves 70 and 72 and the discharge ports of the third and fourth digital solenoid valves 76 and 78. As shown in FIG. 4, the pressure control valve 82 also has an armature that is contained within a cylindrical sleeve 82a that extends from the top surface of the hydraulic valve body 62. The pressure control valve 82 is a proportional valve that is responsive to signals from the ECU 12 to control the pressure of the hydraulic fluid supplied to the digital valves. In the preferred embodiment, the fluid pressures are expected to be in the normal range of conventional power steering systems.

The digital solenoid valves 70, 72, 76 and 78 are either open or closed and are the same as utilized with anti-lock brake systems. In the following discussion, a normally closed valve includes a spring that urges the valve armature to a closed position to prevent fluid from flowing through the valve when the solenoid coil is not energized. Accordingly, energizing the solenoid coil of a normally closed valve will open the valve, allowing fluid to flow therethrough. Similarly, a normally open valve includes a spring that urges the valve armature to an open position to allow fluid flow through the valve when the solenoid coil is not energized. Accordingly, energizing the solenoid coil of a normally open valve will close the valve, preventing the flow of fluid therethrough. Because of the digital operation of the valves, valve construction is simplified. Additionally, for the control unit 60 shown in FIG. 5A, all four valves are identical, reducing inventory requirements. In the preferred embodiment, dump valves from an anti-lock brake system are used for the normally closed valves shown in FIG. 5A. Similarly, isolation valves from an anti-lock brake system are used for normally open valves described below. The use of valves from anti-lock brake systems further reduces the number of unique parts that must be carried by the manufacturer of the roll control system.

Figure 5B:
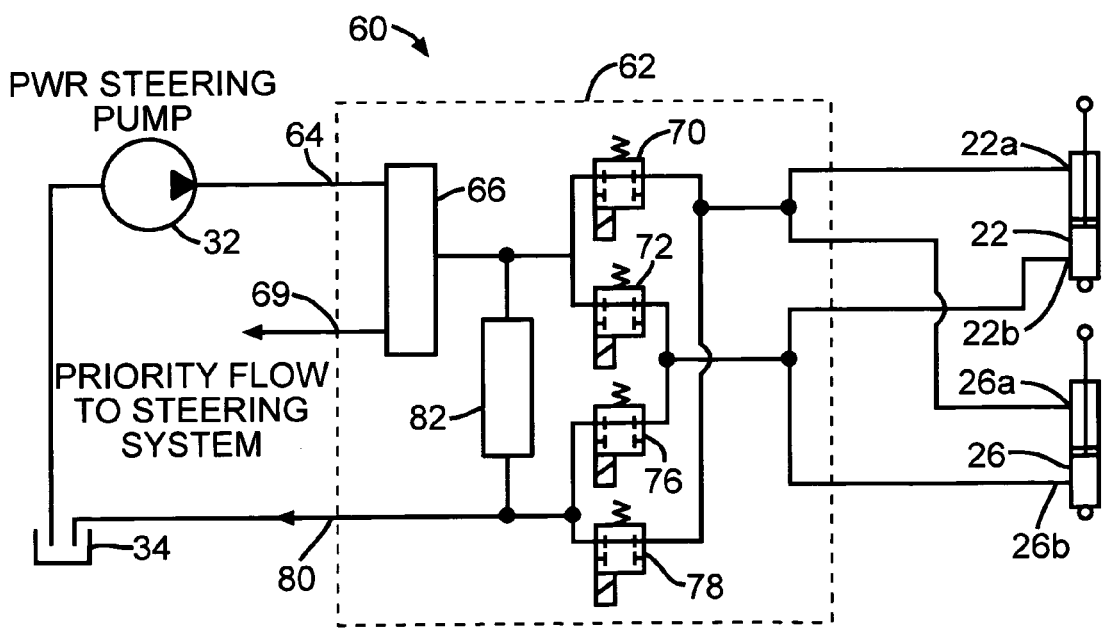
FIG. 5B is a fluid schematic drawing for the roll control system shown in FIG. 3 during straight forward operation of the vehicle.

During operation of the roll control system 80, when the vehicle is moving straight ahead, the solenoids of all four digital valves 70, 72, 76 and 78 are energized continuously, as illustrated in FIG. 5B. Accordingly, all of the digital valves are in their open position and hydraulic fluid will flow through the valve body 62 from the pump 32 to the reservoir 34. No resultant pressure will be exerted on either side of the pistons and the pistons will "float" within their corresponding cylinders.

Figure 5C:
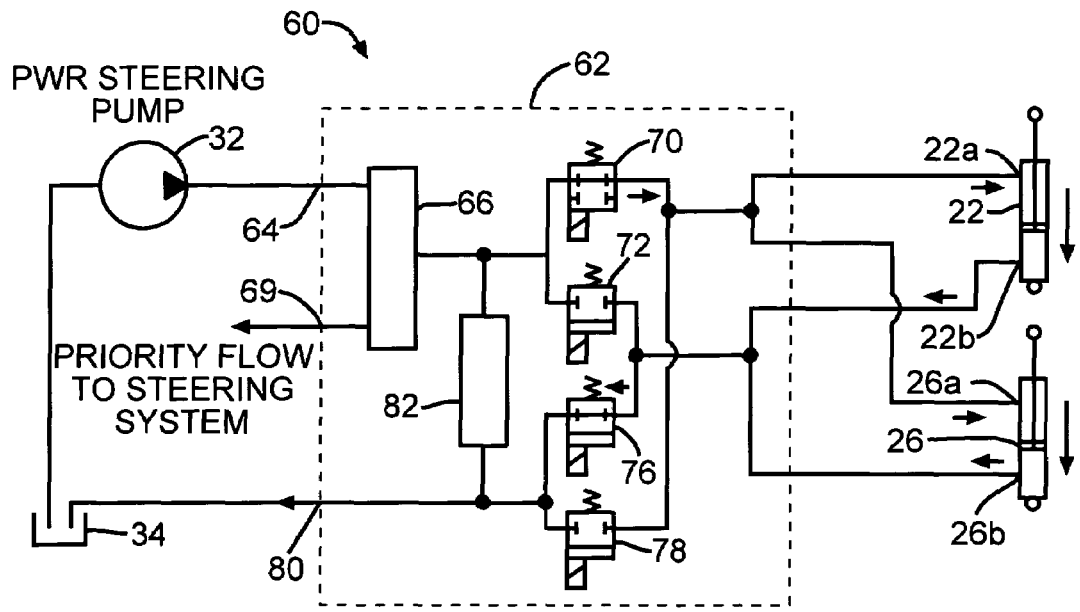
FIG. 5C is a fluid schematic drawing for the roll control system shown in FIG. 3 during a left turn of the vehicle.

During a vehicle left turn, the vehicle will tend to roll to the right and will generate a torque in the front and rear torsion rods 20 and 25. The ECU 12 detects the roll to the right and is operative to deenergize the solenoid coils for the second and fourth normally closed valves 72 and 78, allowing the valves to close, as shown in FIG. 5C. The solenoid coils for the first and third normally closed valves 70 and 76 remain energized and the valves remain open. As a result, pressurized hydraulic fluid is supplied through the first digital valve 70 to the upper cylinder ports 22a and 26a while the lower cylinder ports 22b and 26b are vented to the reservoir 34 through the third digital valve 76. Accordingly, the pistons within the cylinders are urged in an downward direction in FIG. 5C, as illustrated by the small arrows in the figures, to provide a counter-torque to the torsion rods 20 and 25 so as to right the vehicle relative to the wheels.

Figure 5D:
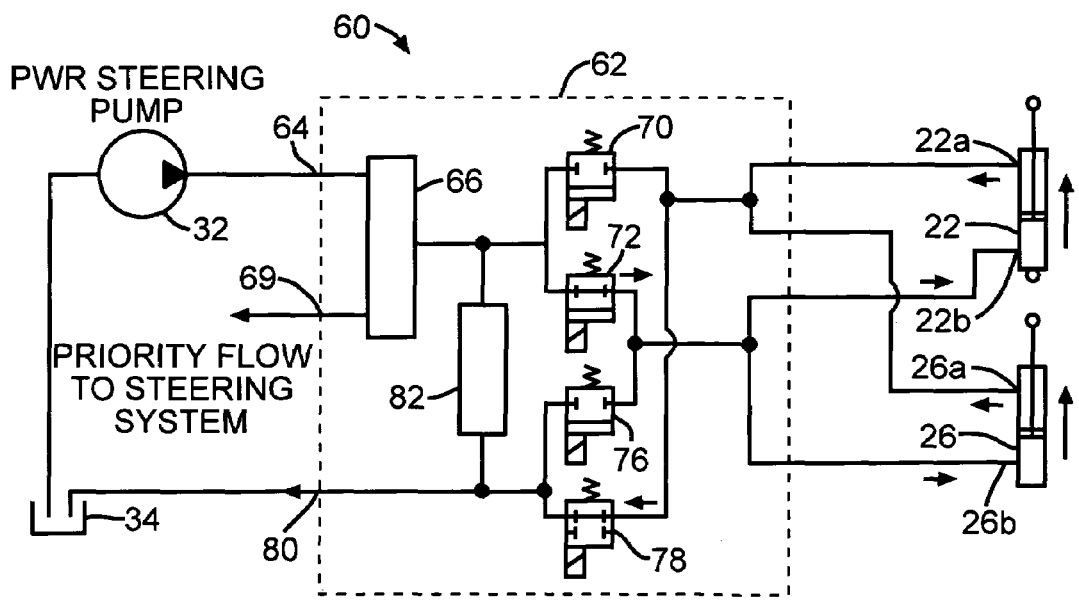
FIG. 5D is a fluid schematic drawing for the roll control system shown in FIG. 3 during a right turn of the vehicle.

During a vehicle right turn, the vehicle will tend to roll to the left and will generate an opposite torque in the front and rear torsion rods 20 and 25. The ECU 12 detects the roll to the left and is operative to deenergize the solenoid coils for the first and third digital valves 70 and 76, allowing the valves to close, as shown in FIG. 5D. The solenoid coils for the second and fourth valves 72 and 78 remain energized and the valves remain open. As a result, pressurized hydraulic fluid is supplied through the second digital valve 72 to the lower cylinder ports 22b and 26b while the upper cylinder ports 22a and 26a are vented to the reservoir 34 through the fourth digital valve 78. Accordingly, the pistons within the cylinders are urged in an upward direction in FIG. 4, as illustrated by the small arrows in FIG. 5D, to provide a counter-torque to the torsion rods 20 and 25 so as to right the vehicle relative to the wheels.

The operation of the roll control system 60 is summarized in the upper portion of the table shown in FIG. 6 that is labeled "Embodiment A". Valve group a for Embodiment A includes the first and third valves 70 and 76 while valve group b includes the second and fourth valves 72 and 78. During a power failure, all four digital valves will assume their closed position, locking the pistons in their current position within the corresponding cylinders.

Figure 7A:
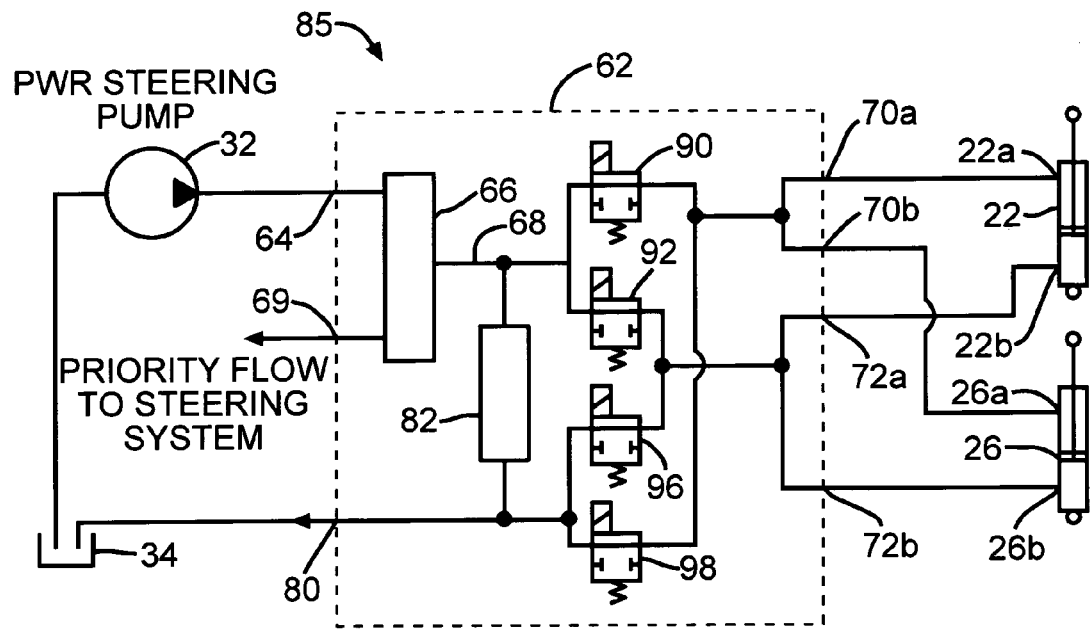
FIG. 7A is a fluid schematic drawing for a first alternate embodiment of the roll control system shown in FIG. 5 during straight forward operation of the vehicle.
Figure 7B:
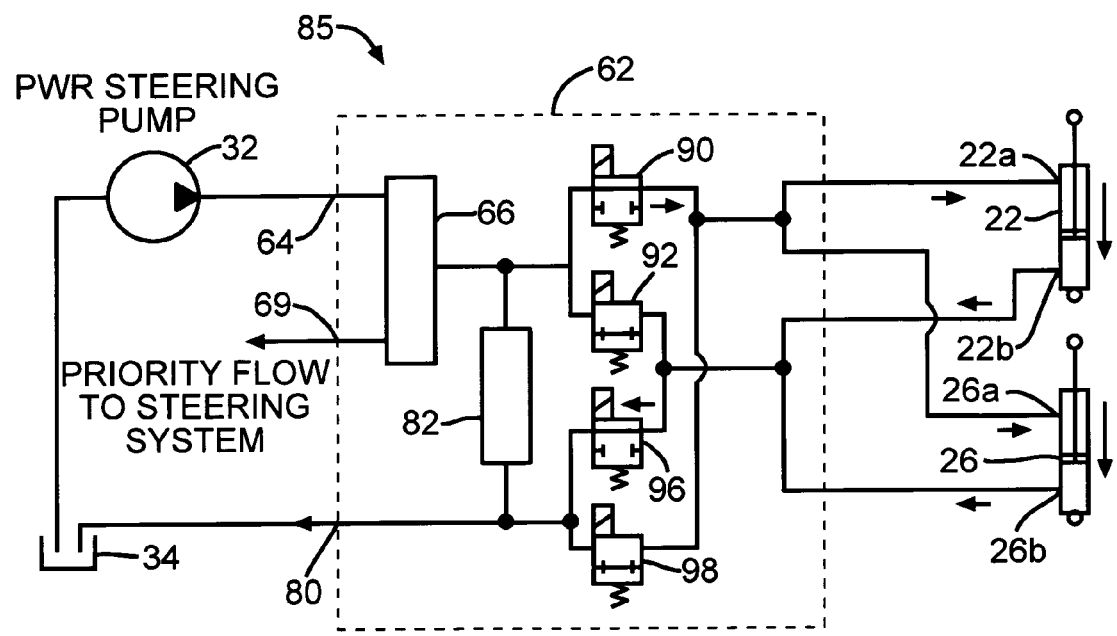
FIG. 7B is a fluid schematic drawing for the first alternate embodiment of the roll control system shown in FIG. 5 during a left turn of the vehicle.
Figure 7C:
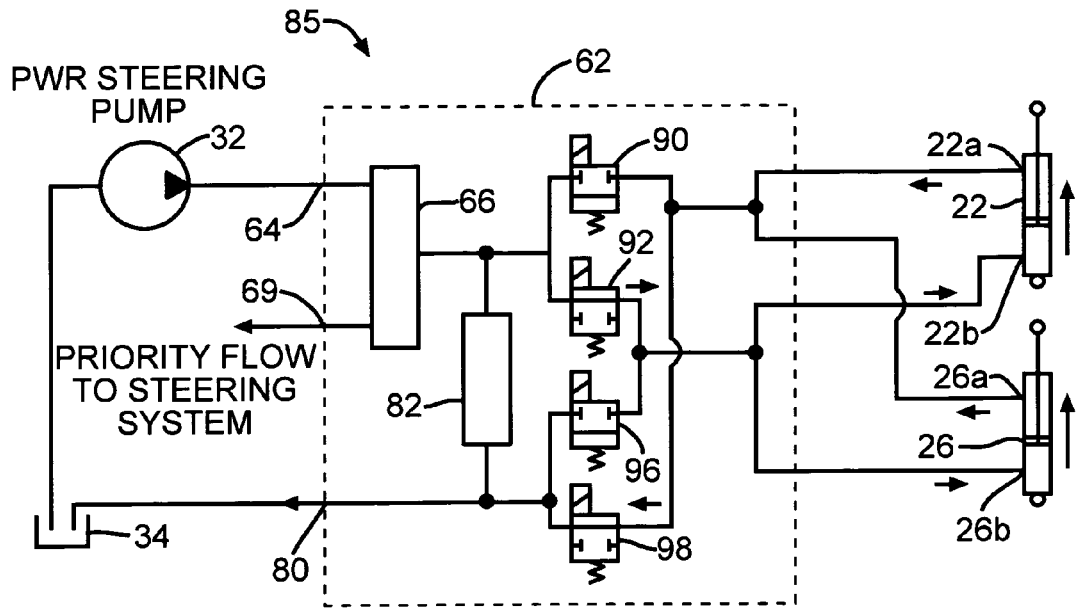
FIG. 7C is a fluid schematic drawing for the first alternate embodiment of the roll control system shown in FIG. 5 during a right turn of the vehicle.

An alternate embodiment 85 of the roll control system is shown in FIGS. 7A through 7C. Components shown in FIGS. 7A through 7C that are similar to components shown in FIG. 5A have the same numerical designators. The alternate embodiment 85 is very similar to the embodiment 60 shown in FIG. 5A except that the normally closed digital valves 70, 72, 76 and 78 have been replaced by normally open digital valves 90, 92, 96 and 98. Accordingly, when no power is supplied to the solenoid coils of the digital valves, all of the valves are normally open, allowing fluid to flow through the valves, as shown in FIG. 7A. When the vehicle is driven straight ahead, all of the solenoid coils for the four digital valves are deenergized and free flow of hydraulic fluid is allowed through the valve body 62 from the pump 32 to the reservoir 34. Accordingly, the pistons "float" within their cylinders as described above. Because most vehicle movement is in a straight line, the alternate embodiment 85 uses less power than the first embodiment described above.

During a left turn, which is illustrated in FIG. 7B, the solenoid coils for the second and fourth normally open digital valves 92 and 98 are energized causing the valves to close, while the solenoid coils for the first and third normally open digital valves 90 and 96 remain deenergized and the valves remain open. As a result, pressurized hydraulic fluid is supplied through the first digital valve 90 to the upper ports 22a and 26b of the front and rear cylinder and piston assemblies 22 and 26 while hydraulic fluid is vented from the lower ports 22b and 26b through the third digital valve 96, as shown by the small arrows in the FIG. 7B. Accordingly, the pistons are urged in a downward direction in FIG. 7B to provide a counter-torque to the torsion rods 20 and 25.

During a right turn, which is illustrated in FIG. 7C, the solenoid coils for the first and third digital valves 90 and 96 are energized causing the valves to close, while the solenoid coils for the second and fourth digital valves 92 and 98 remain deenergized and valves remain open. As a result, pressurized hydraulic fluid is supplied through the second digital valve 92 to the lower ports 22 and 26b of the front and rear cylinder and piston assemblies 22 and 26 while hydraulic fluid is vented from the upper ports 22a and 26a through the fourth digital valve 98, as shown by the small arrows in the FIG. 7C. Accordingly, the pistons are urged in a upward direction in FIG. 7C to provide a counter-torque to the torsion rods 20 and 25.

The operation of the digital valves 90, 92, 96 and 98 is summarized in the middle portion of the table shown in FIG. 6 that is labeled "Embodiment B". Valve group a for Embodiment B includes the first and third valves 90 and 96 while valve group b includes the second and fourth valves 92 and 98. During a power failure, all four digital valves will assume their open position, allowing the pistons to float within the corresponding cylinders.

Figure 8A:
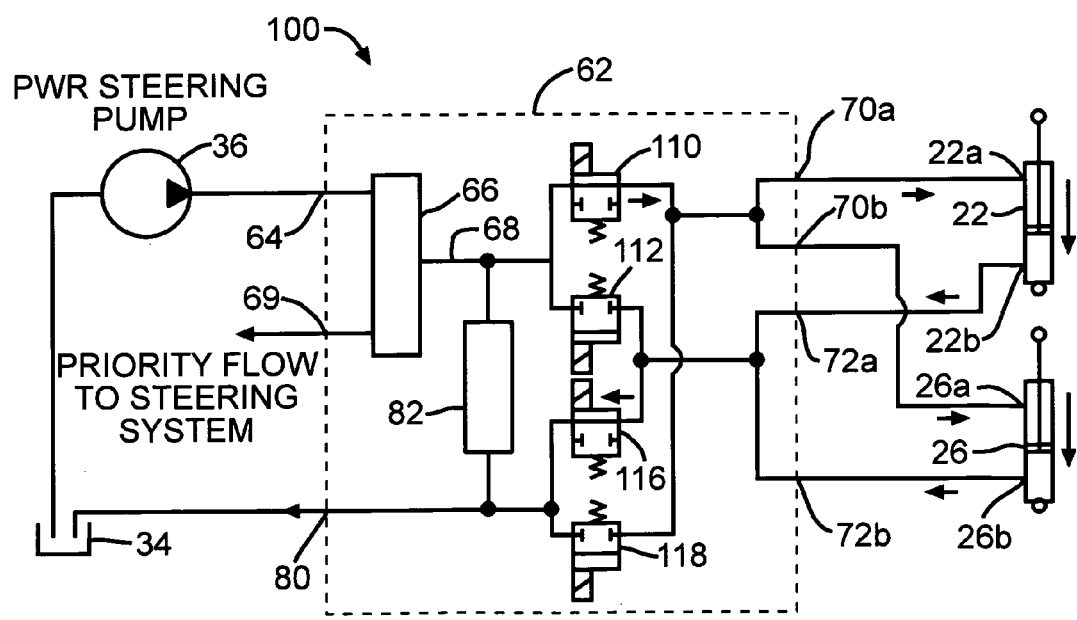
FIG. 8A is a fluid schematic drawing for a second alternate embodiment of the roll control system shown in FIG. 5 during a left turn of the vehicle.
Figure 8B:
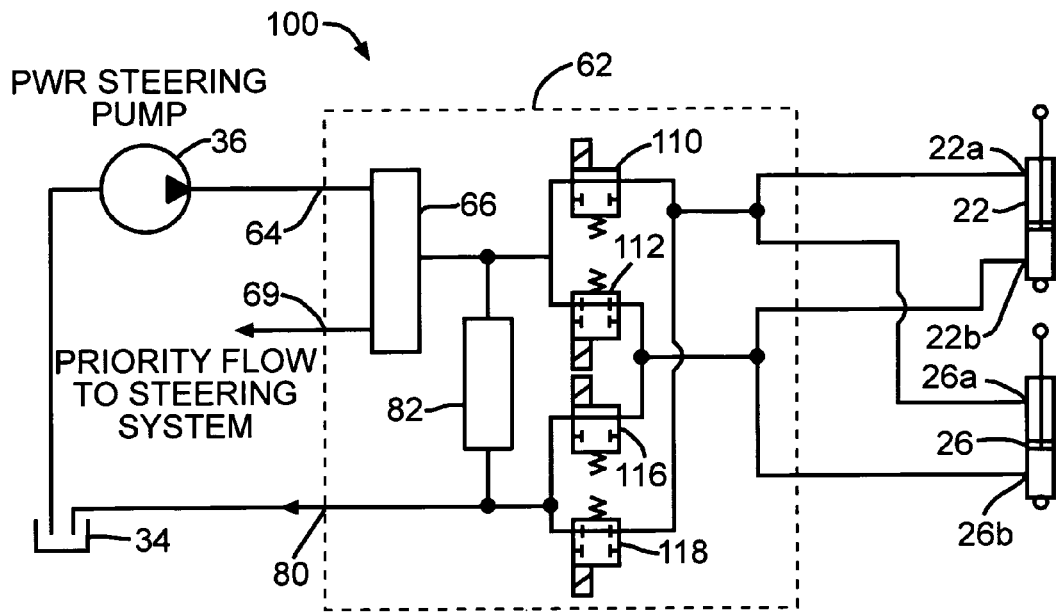
FIG. 8B is a fluid schematic drawing for the second alternate embodiment of the roll control system shown in FIG. 5 during straight forward operation of the vehicle.
Figure 8C:
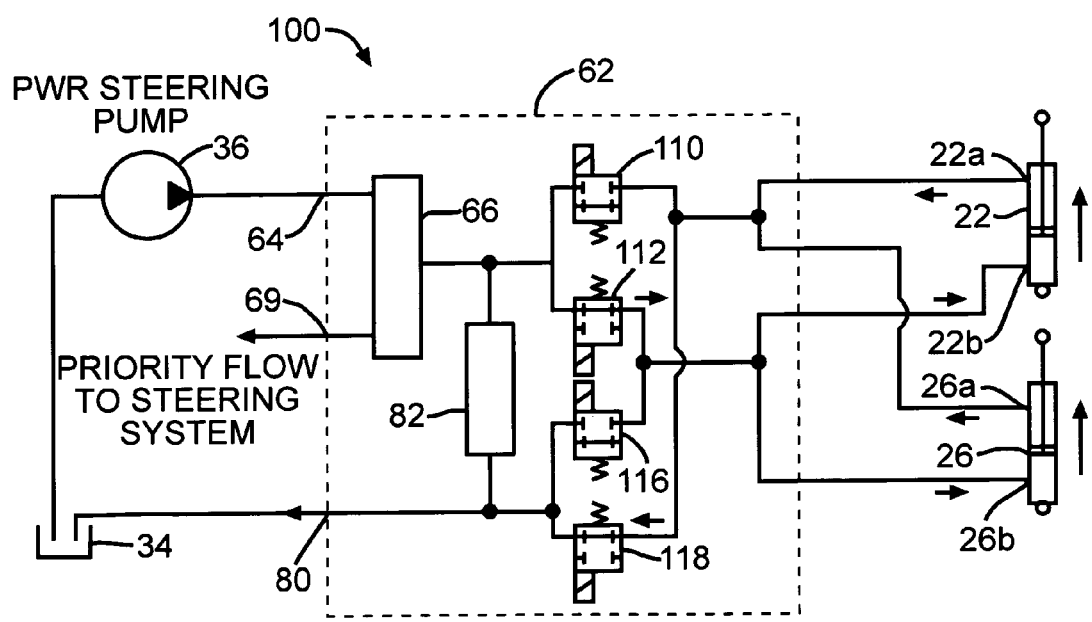
FIG. 8C is a fluid schematic drawing for the second alternate embodiment of the roll control system shown in FIG. 5 during a right turn of the vehicle.

A second alternate embodiment 100 of the roll control system is illustrated in FIGS. 8A through 8C. As before, the components in FIGS. 8A through 8C which are similar to components shown in FIG. 4A have the same numerical identifiers. The alternate embodiment 100 includes a pair of normally open digital solenoid valves for the first and third valves 110 and 116, respectively, and a pair of normally closed digital solenoid valves for the second and fourth valves 112 and 118, respectively. FIG. 8A shows the status of the valves when all of the solenoid coils are not energized.

As shown in FIG. 8A, pressurized hydraulic fluid is supplied through the first digital valve 110 to the upper ports 22a and 26a of the front and rear cylinder and piston assemblies 22 and 26 while the lower ports 22b and 26b are vented through the third valve 116 to the reservoir 34. Accordingly, each of the pistons are urged in a downward direction within their corresponding cylinders. As described above, a downward thrust of the pistons counters vehicle body roll resulting from a left turn.

In FIG. 8B, the solenoid coils for the second and fourth normally closed valves 112 and 118 are energized, causing the valves to open and allowing flow therethrough, while the solenoid coils for the first and third normally open valves 110 and 116 remain deenergized and the valves remain open. Accordingly, free flow of hydraulic fluid is allowed through the valve body 62 from the pump 32 to the reservoir 34 and the pistons "float" within their cylinders as described above during straight ahead movement of the vehicle.

In FIG. 8C, the solenoid coils for all four of the valves are energized. As a result, the first and third valves 110 and 116 are closed while the second and fourth valves 112 and 118 are open. Accordingly, pressurized hydraulic fluid flows through the second valve 112 to the lower ports 22b and 26b of the front and rear cylinder and piston assemblies 22 and 26, as shown by the small arrows. At the same time, the upper cylinder ports 22a and 26a are vented though the fourth valve 118 to the reservoir 34. Accordingly, the pistons are urged in an upward direction in FIG. 8C, which corresponds to the desired action during a right turn.

The operational positions of the valves in the second alternate embodiment 100 are summarized in the lower portion of FIG. 6 that is labeled "Embodiment C". Valve group a in Embodiment C includes the first and third valves 110 and 116 while valve group b includes the second and fourth valves 112 and 118.

Figure 9:
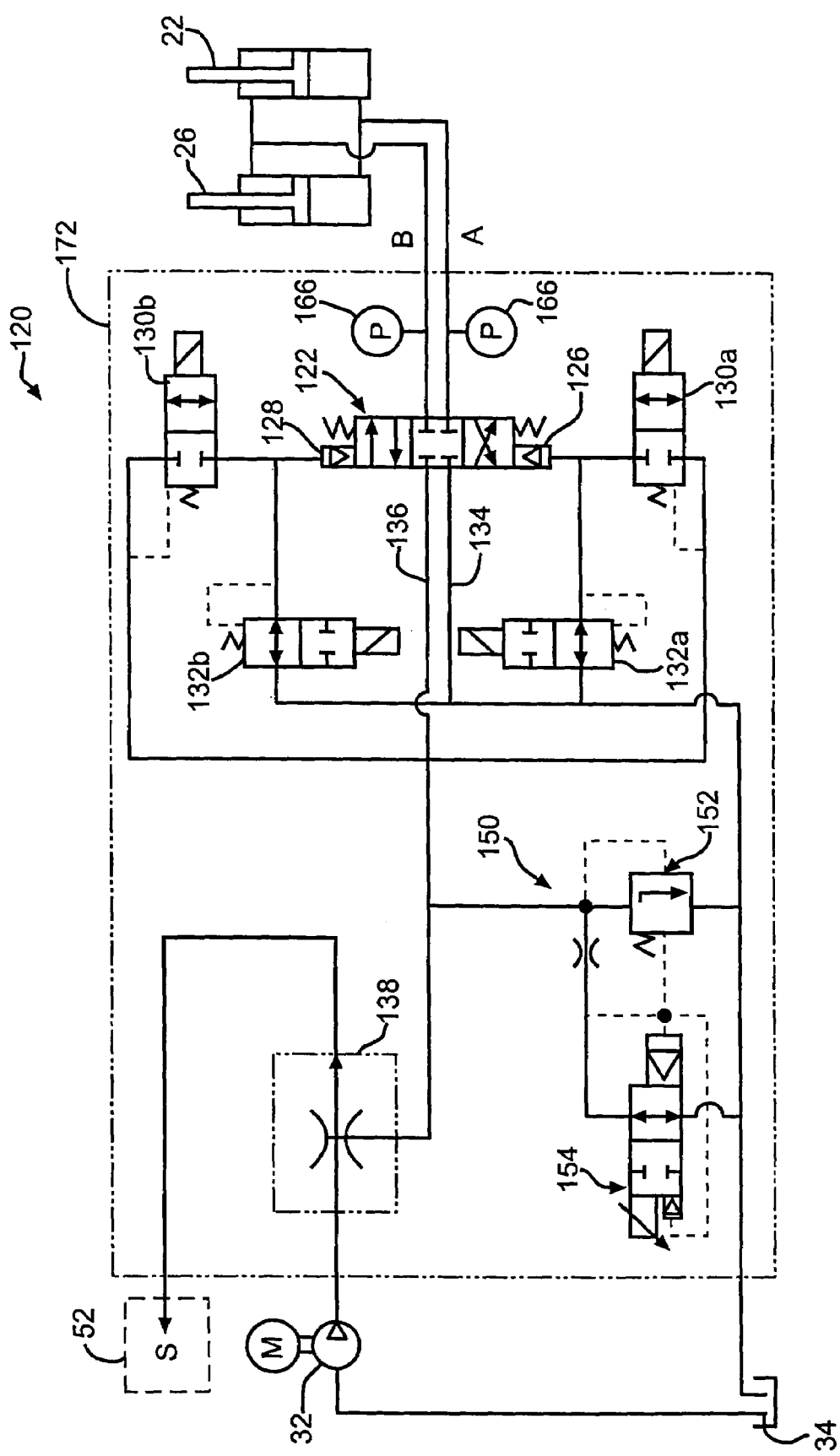
FIG. 9 is a fluid schematic drawing for another alternate embodiment of the roll control system shown in FIG. 3.
Figure 10:
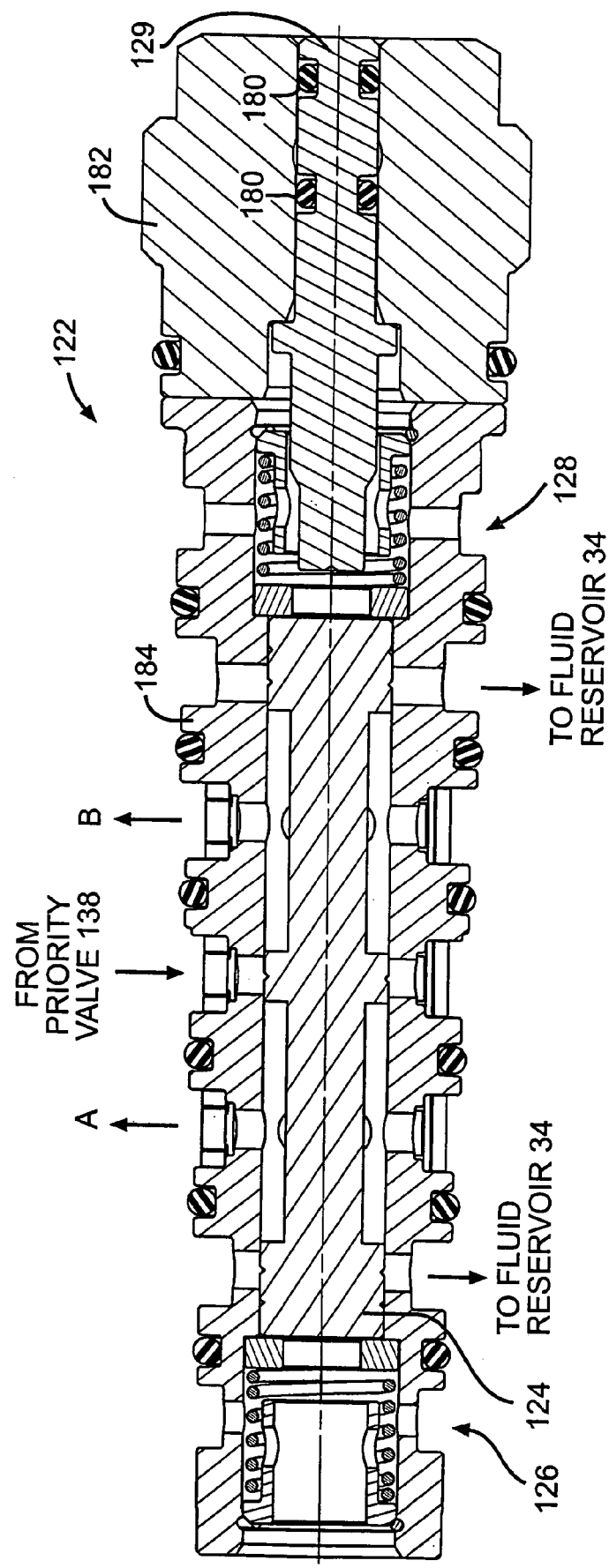
FIG. 10 is a sectional view of a three-position four-way directional valve that is included in the control system shown in FIG. 9.

Another alternate embodiment 120 of the invention is illustrated in FIG. 9 where components that are similar to components shown in previous figures have the same numerical identifiers. The alternate embodiment 120 includes a three-position four-way directional valve 122 for controlling the flow of hydraulic fluid to the front and rear cylinder and piston assemblies 22 and 26. As best seen in FIG. 10, a slidable spindle 124 within the directional valve is moved axially by first and second pilot valves 126 and 128, respectively, that are located in the ends of the directional valve 122. The directional valve also includes a plunger 129 at one end that is utilized to remove air from the ARC system, as will be described below.

Figure 11:
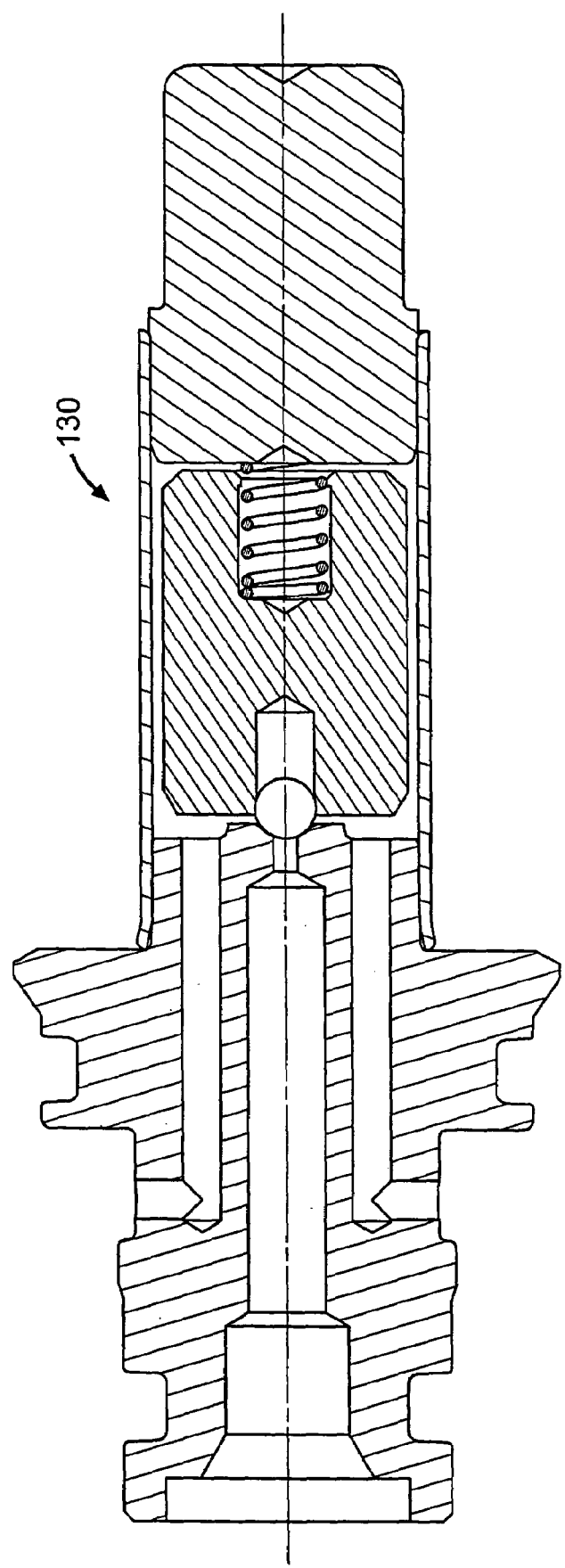
FIG. 11 is a sectional view of a normally closed digital valve that is included in the control system shown in FIG. 9.
Figure 12:
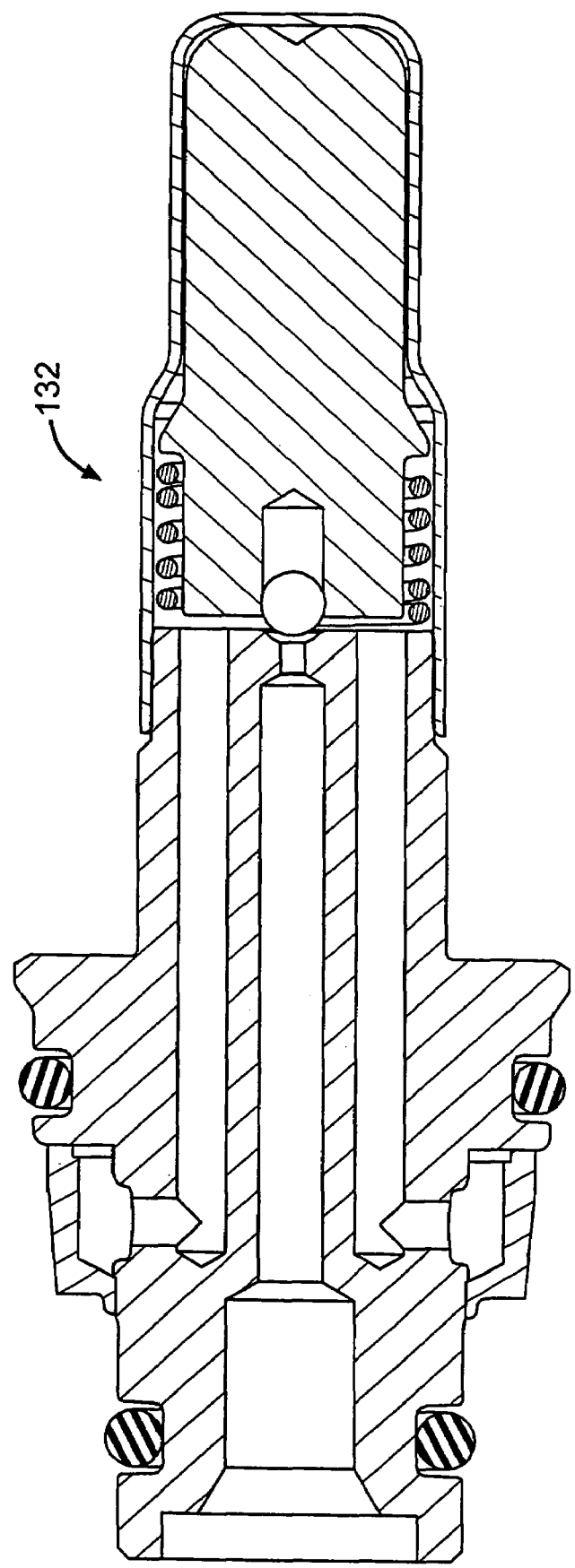
FIG. 12 is a sectional view of a normally open digital valve that is included in the control system shown in FIG. 9.

The first pilot valve 126 of the directional valve 122 is connected to an normally closed digital solenoid valve 130a and a normally open digital solenoid valve 132a. A sectional view of the normally closed valve is shown in FIG. 11 while a sectional view of the normally open valve is shown in FIG. 12. In the preferred embodiment, digital valves from an electro-hydraulic brake system are utilized for the normally closed and normally open valves 130a and 132a. The normally open and closed valves 130a and 132a communicate with the ports shown at the left end of FIG. 10 and are operative to apply or relieve pressurized hydraulic fluid to the first pilot valve 126. Applying pressure urges the spindle 124 to the right in FIG. 10. Relieving the pressure allows the spring contained in the second pilot valve 128 to urge the spindle 124 back to the left. Similarly, the second pilot valve of the directional valve 122 also is connected to an normally closed digital solenoid valve 130b and a normally open digital solenoid valve 132b, that have the same construction shown in FIGS. 11 and 12. Applying pressure to the second pilot valve 128 urges the spindle 124 to the left in FIG. 10 while relieving the pressure allows the spring contained in the first pilot valve 128 to urge the spindle 124 back to the right. When to pressure is applied to the pilot valves 126 and 128, the spindle 124 is returned to the center position by the pilot valve springs, blocking fluid flow to and from the cylinder and piston assemblies 22 and 26.

Figure 13:
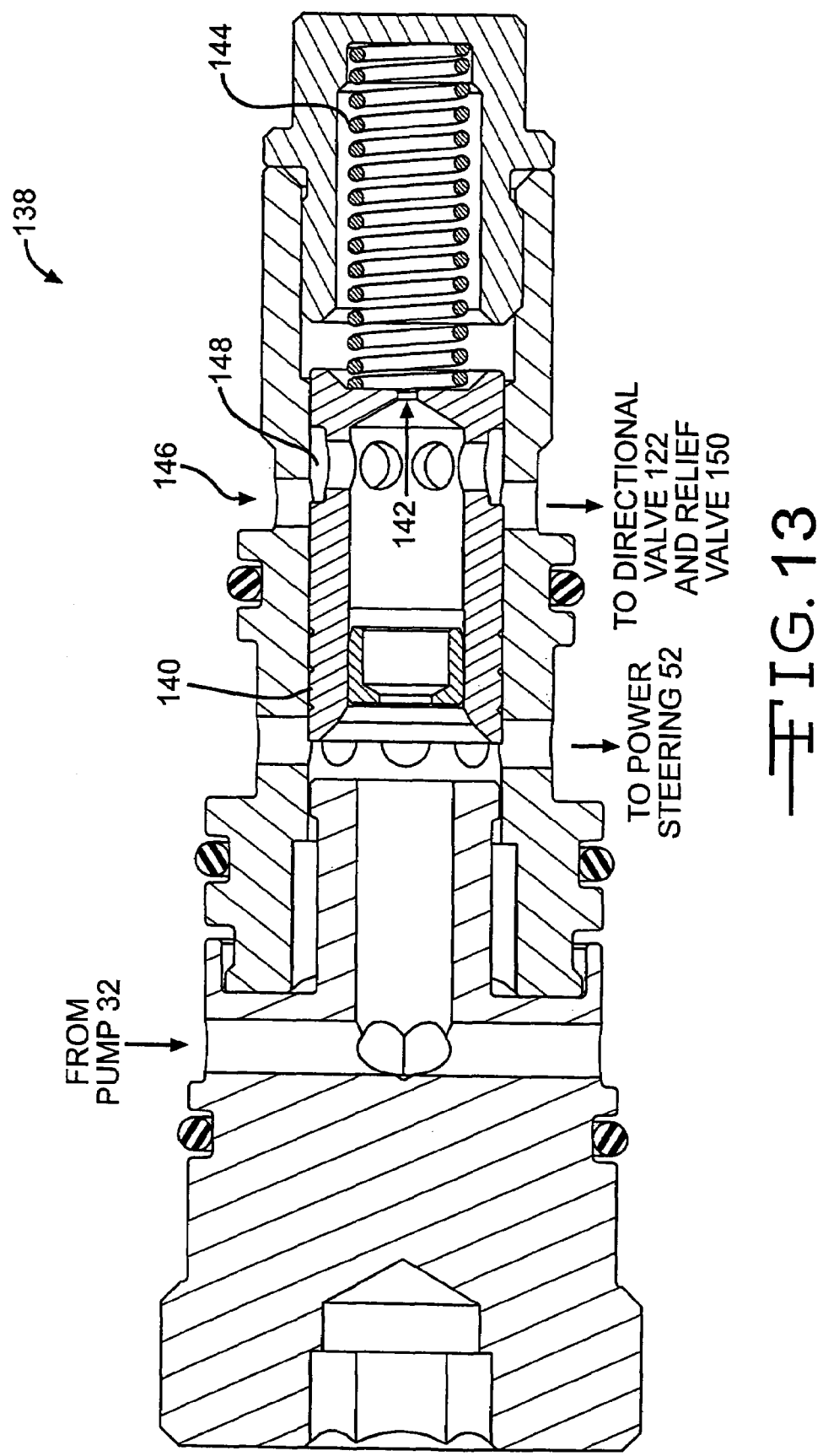
FIG. 13 is a sectional view of a priority valve that is included in the control system shown in FIG. 9.

The directional valve 122 is connected by a drain line 134 to the fluid reservoir 34 and the directional valve 122 also is connected by a feed line 136 to a priority valve 138. A sectional view of the priority valve 138 is shown in FIG. 13. The priority valve 138 receives pressurized hydraulic fluid from the power steering pump 32 and divides the pump fluid flow between the power steering valve assembly 52 and the directional valve 122. In the preferred embodiment, the power steering pump 32 is oversized by approximately 50 percent to provide flow for both the power steering and the ARC system.

The priority valve 138 controls the flow to a primary circuit, in this case the vehicle steering valve assembly 52. Flow is taken in through the end of a valve spool 140 and passed over a fixed orifice 142. This flow continues to the steering valve assembly 52. There is a pressure drop across the fixed orifice causing a force to push the spool in the direction of the flow. A spring 144 opposes the force caused by the pressure drop. If the spring force is larger than the pressure drop force, the spring pushes the spool to a stop. When the flow increases to a point where the pressure drop equals the spring force, the spring begins to compress. Thus, the spring 144, orifice 142 and spool 140 arrangement keeps a constant pressure drop across the fixed orifice (By the orifice equation, the flow through a fixed orifice is proportional the square root of the pressure drop across the orifice). The priority valve 138 is fitted with a bypass port 146 so that when the spring begins to compress, flow is sent along a parallel path to bypass or, in this case, to the ARC system circuit. In this manner, flow up to a set amount is sent to the primary circuit and all flow above that amount is sent to the ARC system circuit.

The priority valve 138 adds one feature to a conventional bypass flow control valve that is typically used to control flow from a power steering pump. The fluid flow going over the fixed orifice is passes over a metering orifice 148 as it exits the priority valve 138. When the valve spring compression is increased this metering orifice 148 is reduced. This prevents the increased pressure at the inlet resulting from increased pressure in the bypass circuit from forcing more flow through to the primary (priority) circuit. As the speed of the power steering pump 32 rises from zero to idle, all of the flow goes to steering valve assembly 52 until the requirement for steering is met, then the remainder goes to the ARC system. Any small fluctuation in pump flow results in variable flow to ARC system and constant flow to steering.

Figure 14:
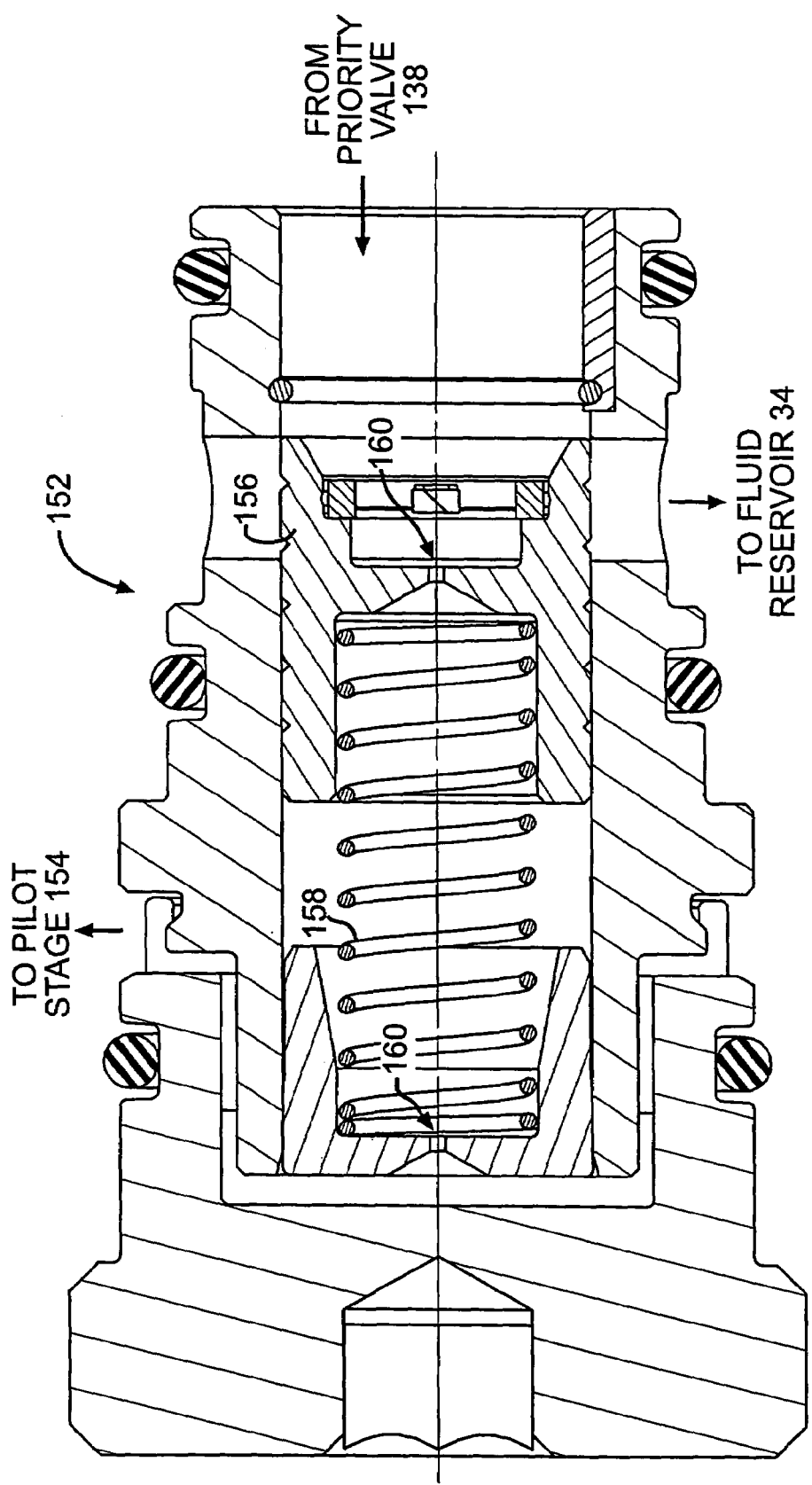
FIG. 14 is a sectional view of a main stage of a pressure valve that is included in the control system shown in FIG. 9.
Figure 15:
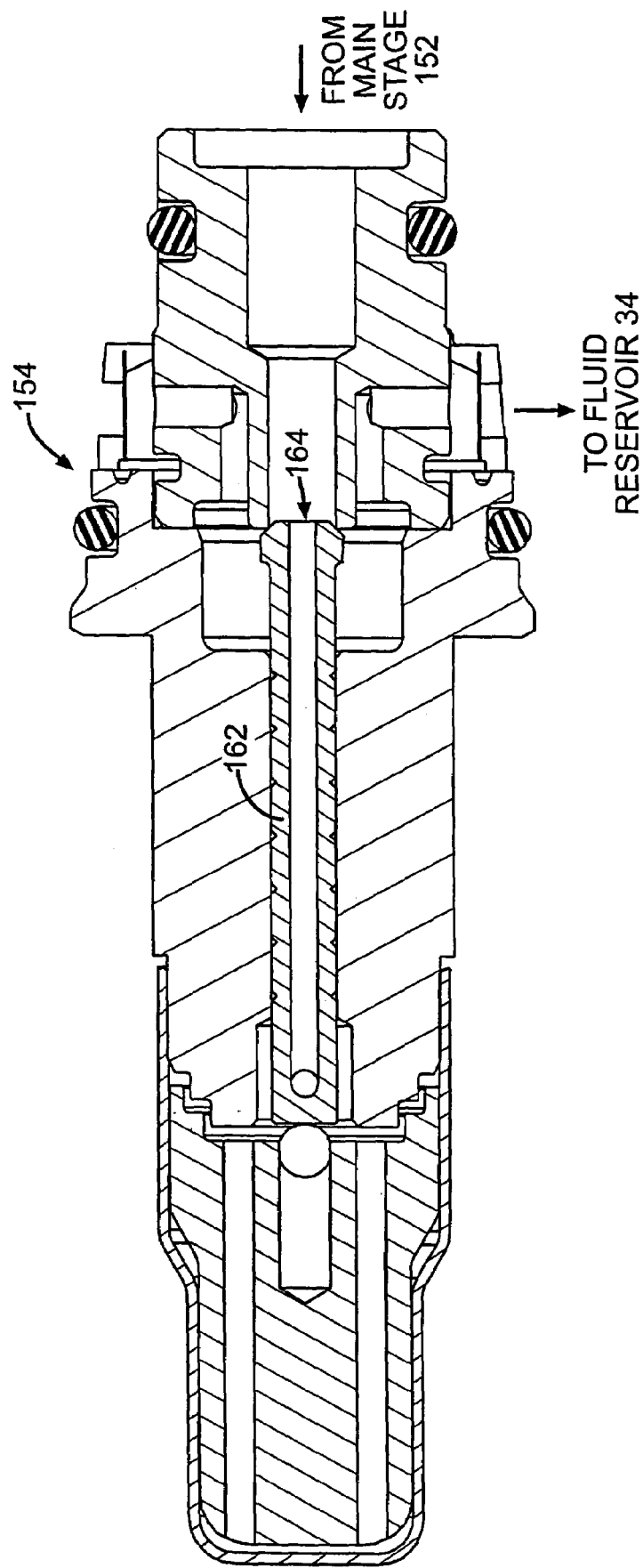
FIG. 15 is a sectional view of a proportional pilot valve stage of a pressure valve that is included in the control system shown in FIG. 9.

The present invention contemplates controlling pressure in the ARC system 120 as a function of the lateral acceleration of the vehicle. This is done with a two-stage proportional pressure relief valve 150 having a main stage 152 that is large enough to carry the flow to the ARC system and a pilot stage 154 that is small enough to fit the solenoid coil for the pilot stage 154 into a Control Integrated Module (CIM) that includes the electronic control components for the ARC system 120. A sectional view of the main stage 152 is shown in FIG. 14 while a sectional view of the pilot stage 154 is shown in FIG. 15. The pressure relief valve 150 is connected between the feed line 136 supplying pressurized hydraulic fluid to the directional valve 122 and the reservoir 34. When there is no flow demand from the actuators 22 and 26, all of the fluid flow in line 136 for the ARC system is diverted to the reservoir 34. Otherwise the pressure of the hydraulic fluid supplied to the directional valve is controlled by the pressure relief valve 150 reducing the diverted flow to the reservoir 34.

As shown in FIG. 14, the main stage 152 of the pressure relief valve 150 is a spool valve having a spool 156 that meters flow over one end. The other end of the spool 156 is forced toward the closed position by a spring 158 the sets a pressure drop across the spool. A orifice 160 in the center of the spool 156 passes a small, constant amount of flow to the pilot stage 154. This flow is a function of the pressure drop across the main stage spool 156 and the orifice 160 in the center of the spool. The pilot stage 154 sets a pressure by impinging on the constant flow stream sent through the main valve spool 156. This is a simple force/area relationship. Thus, the main stage 152 of the pressure relief valve 150 balances pressure across the ends of the spool 156. The pressure at the inlet, which is at the right end of FIG. 14, is on one end of the spool 156 and a spring 158 and the pressure created by the pilot stage 154 is at the other end. As described above, there is a small fixed orifice 160 in the center of the spool 156. Just as in the priority valve 138, the spring 158 and spool 156 arrangement works to keep a constant pressure drop across the small fixed orifice 160. This does two things. First, it means that a small fixed flow is sent to the pilot stage valve 154. The pilot stage valve 154 acts on this flow to create pilot pressure by a simple force/area relationship. Second, the pressure on the inlet side of the spool valve 152 is raised to match the pilot pressure plus the spring force. Thus the ARC system pressure is set to the pressure set by the pilot stage valve 154 plus the pressure produced by the spring 158.

The spring force in the main stage 152 is chosen so that the pressure drop across the main stage is enough to switch the directional valve 122 by operating the digital valves 130 and 132. In the preferred embodiment, the pressure drop is set at three bar. Given this pressure drop, the orifice size 160 in the main spool 156 is calculated to send a desired amount of flow to the pilot stage valve 154. The greater the flow, the easier it is to get good regulation from the pilot valve 154. The smaller the flow, the greater are the accuracy requirements for the key elements of the pilot valve. The flow to the pilot stage valve 154 does represent a power usage in the system, so it is desired to minimize this flow. This conflicting requirement for the pilot flow is a central issue in the design of the hydraulics.

The pilot stage valve 154 is ball-on-seat style to a balanced poppet valve, as shown in FIG. 15. A Normally Open (NO) proportional solenoid valve is needed for the pilot stage so that there is minimum ARC system pressure with no power to the system. In the preferred embodiment a NO proportional valve designed for an electro-hydraulic brake system is utilized that has a 0.7 mm seat diameter. While this is too small to control 4 LPM of flow for the ARC system, it is sufficient to control pilot pressure as a pilot stage. The two solid lines to the pilot valve 154 in FIG. 9 represent the flow line coming in from the main stage valve 152 and the flow line going out to the reservoir 34. The dashed lines in FIG. 9 do not represent separate hydraulic connections but show where pressure acts on the pilot valve 154 and from where this pressure is generated. The dotted lines indicate that pressure downstream of the orifice acts on one side of the main valve spool, and on both ends of the pilot valve poppet 162. As shown in FIG. 15, an axial bore 164 extends through the poppet 162 to port pressure on the larger end of the poppet to the smaller end thereof. The schematic of the pilot valve 154 in FIG. 9 shows two pressure area symbols. The one on the right side of the valve symbol is larger than the one on the left side of the valve symbol. This indicates that the area exposed to pressure on the side of the poppet 162 tending to open the poppet is larger that the area on the side tending to close the poppet. Thus, the solenoid force has to act against the force generated by the pressure acting on the difference in the two areas. The pilot stage valve 154 is proportionally opened in response to a signal from the lateral accelerometer 16 to increase the pressure supplied to the ARC system. Thus, as the vehicle turns more sharply, the lateral acceleration of the vehicle increases, causing a similar increase in the pressure of the fluid supplied to the ARC system and, thereby, greater displacement of the front and rear cylinder and piston assemblies 22 and 26.

The ARC system 120 also includes a pair of pressure sensors 166 that monitor the hydraulic fluid pressure being supplied to the front and rear cylinder and piston assemblies 22 and 26 at the outlet ports A and B. The pressures indicate to the ECU that the valves are responding properly to the control commands sent from the ECU to the solenoid valves. Should the ECU detect an incorrect response, or no response, the ECU will disable the ARC system 120 and signal the vehicle operator by illuminating a warning light.

Figure 16:
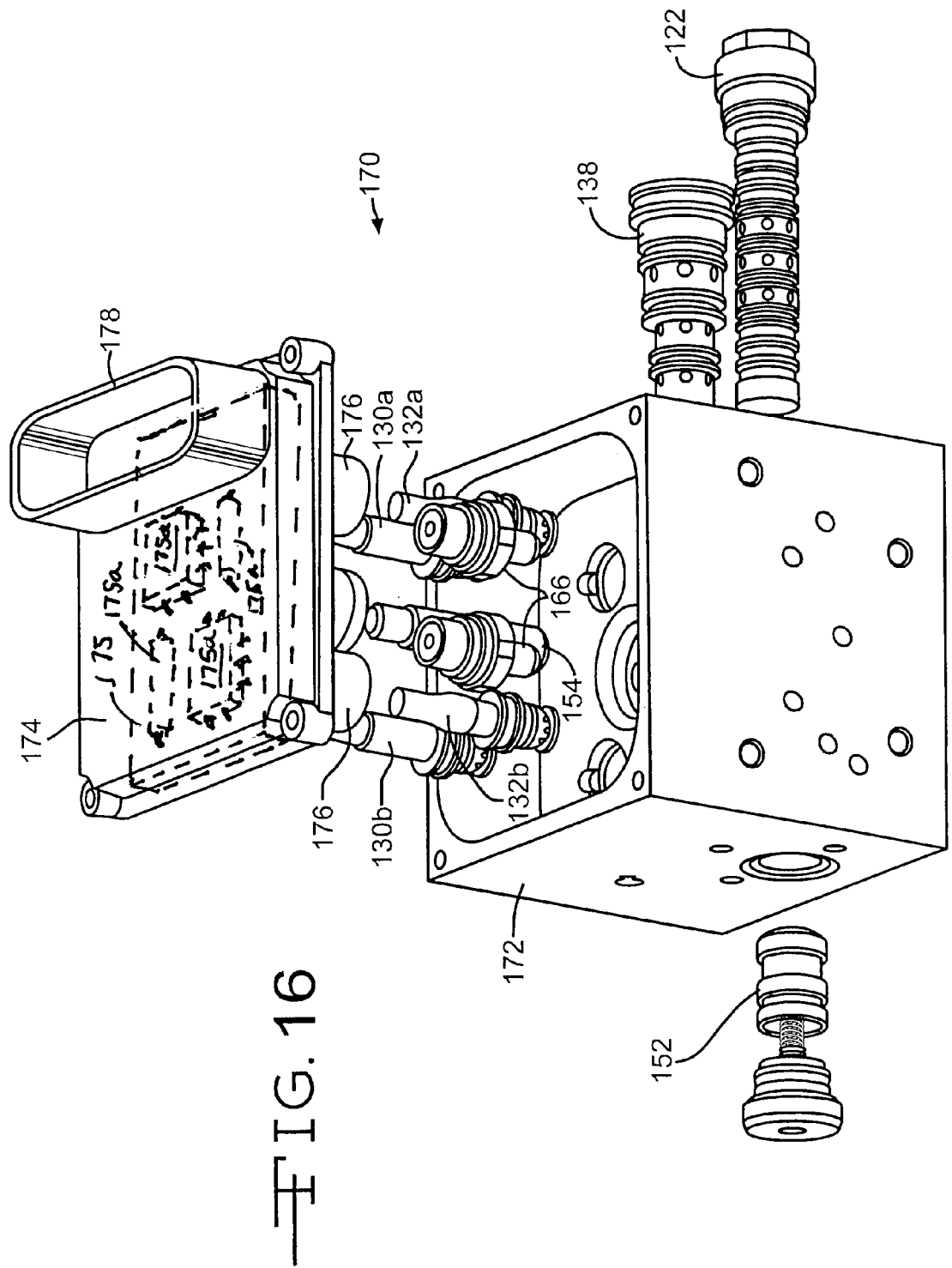
FIG. 16 is an exploded perspective drawing of the integrated control unit used in the roll control system shown in FIG. 9.

The electronics for controlling the valves shown in FIG. 9 are integrated with valves in an integrated ARC unit 170 that is shown in FIG. 16. The valves and pressure sensors 166 are mounted in a hydraulic valve body 172. Accordingly, an outline of the hydraulic valve body is included in FIG. 9. An ECU 174 carries a circuit substrate 175 (shown schematically in phantom in FIG. 16) upon which the electronic control components 17a (also shown schematically in phantom in FIG. 16) and solenoid coils 176 for the solenoid valves are mounted. The ECU 174 is removably attached to the valve body 172. Thus, the electronics can be removed for servicing and/or trouble shooting without opening the hydraulic circuit of the ARC system. An electrical connector 178 provides electrical connections to the power supply and any sensors needed by the control algorithm, such as the wheel speed sensors 14, lateral accelerometer 16 and steering angle detector 18. The hydraulic valve body 172 to connected to the other ARC system components as described above.

The subject ARC system 120 shown in FIG. 9 allows small valves to control large flows. Flow is supplied by a hydraulic pump which is powered in some fashion by the motor vehicle. As described above, flow is directed to the actuators 22 and 26 by a three-position-four-way valve 122 that is controlled by two pairs of small ABS style solenoid valves 130 and 132. This allows for a minimum of power to be supplied by the vehicle to operate the system 120. Also, this valve arrangement allows a desirable failure mode where hydraulic fluid is locked into the hydraulic actuators 22 and 26, there by locking in the anti-roll bar in case of a system failure. If electrical power is not or can not be supplied to the small digital valves 130 and 132, the three-position-four-way valve 122 will maintain a center position locking fluid into the actuators 22 and 26 and causing the anti-roll bar to act as in a conventional suspension system. In addition, a condition for allowing for deactivation of the anti-roll bar for straight head driving is easily achievable. This is done by applying a small amount of power to one pair of the digital valves to allow fluid to easily pass to and from the actuator cylinders. Fluid pressure is determined by a valve that supplies pressure proportional to an applied current. The use of a piloted operated pressure control valve 150 allows a small valve 154 to control large flows without large pressure drops added to the system. In this particular case a special advantage to using a piloted valve is that it allows the use of a small solenoid coil that can be incorporated in the associated electronics package. This is a significant competitive advantage in that it allows the electronics and hydraulics to be packaged together in a compact package 170. Use of the pilot valve 154 also allows the use of a small amount of current lowering the power demands of the system 120.

Figure 17A:
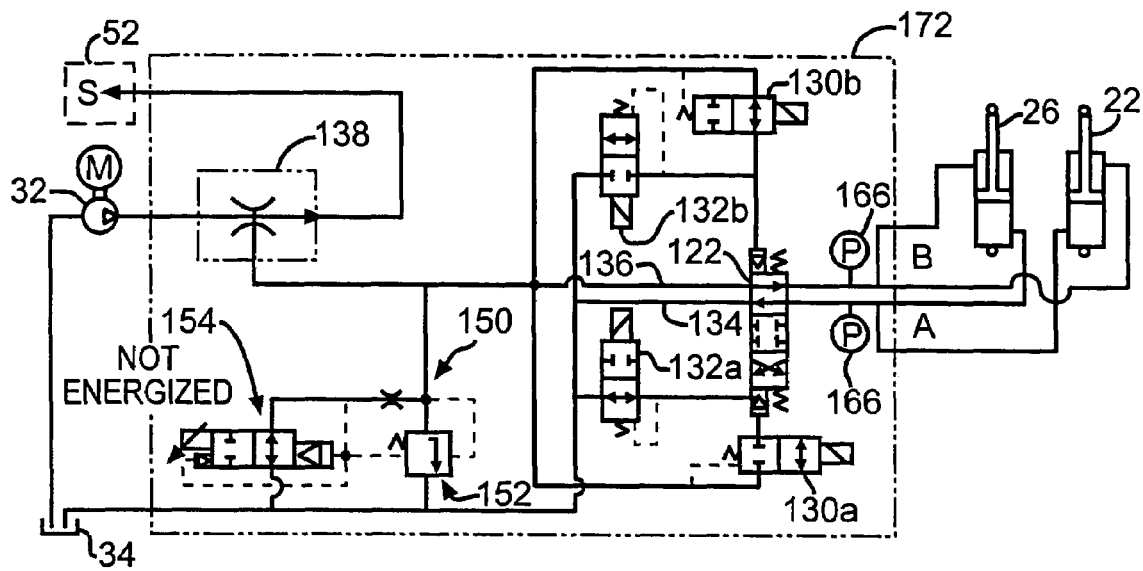
FIG. 17A is a fluid schematic drawing for an alternate embodiment of the roll control system shown in FIG. 9 during straight forward operation of the vehicle.

The operating modes of the ARC system 120 are illustrated by FIGS. 9 and 17A through 17E. The valve positions shown in FIG. 9 represent the system when the vehicle is off and all of the solenoid valves are deactivated. A standby mode that is used when the vehicle is stationary with the engine idling or when driving straight ahead is illustrated in FIG. 17A. In FIG. 17A, the pump 32 has been activated and is supplying pressurized hydraulic fluid to the priority valve 138 which diverts a portion of the fluid to the feed line 136. However, the pilot valve 154 is not energized so that the main stage 152 diverts the flow to the reservoir 34 and no pressure is applied to the direction valve 122. Additionally, a small amount of pressure is applied through one pair of the digital valves 130b and 132b, which are energized, to urge the spool 124 in the directional valve 122 in a downward direction in FIG. 17A. The downward movement of the spool 124 allows fluid to easily pass to and from the actuator cylinders 22 and 26 such that no resultant pressure will be exerted on either side of the pistons. Therefore, the pistons will "float" within the cylinders and thereby unlock the front and rear anti-roll bars 20 and 25 to provide an improved ride with the anti-roll bars 20 and 25 acting as in a conventional suspension system.

Figure 17B:
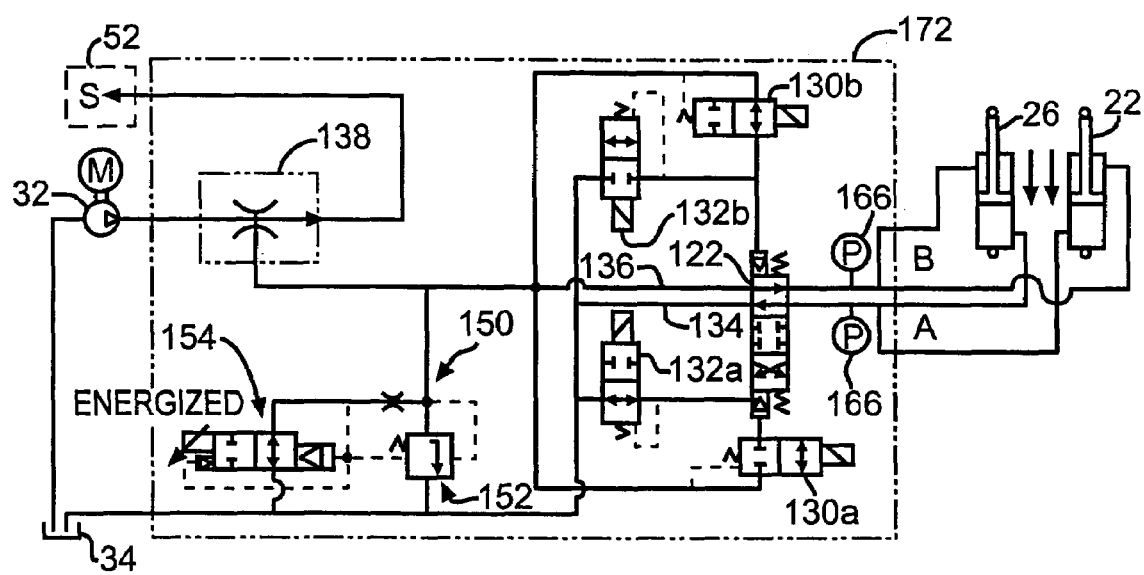
FIG. 17B is a fluid schematic drawing for an alternate embodiment of the roll control system shown in FIG. 9 during a right turn of the vehicle.
Figure 17C:
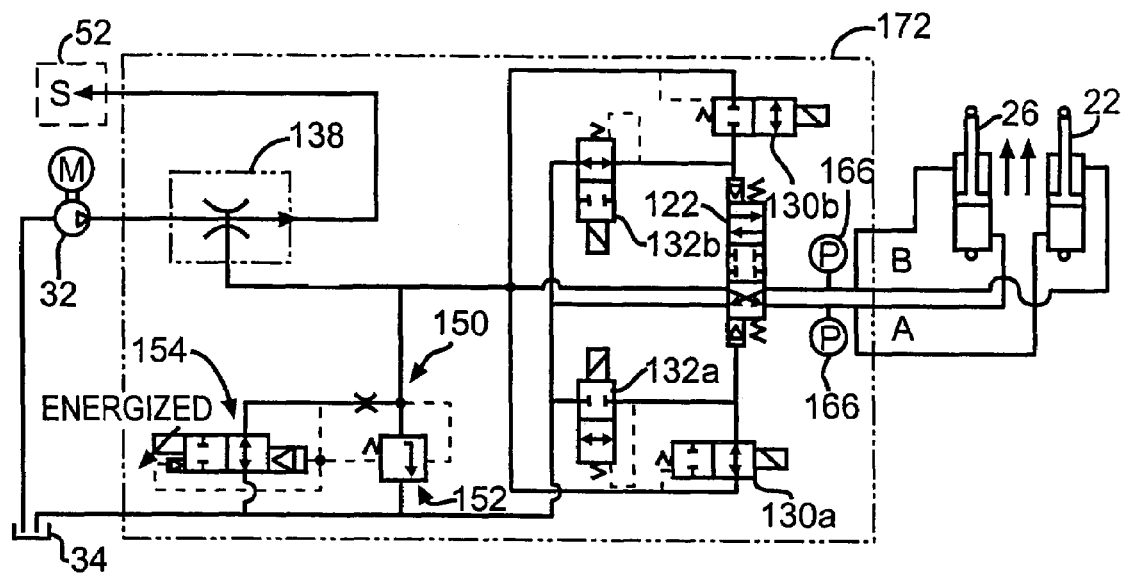
FIG. 17C is a fluid schematic drawing for an alternate embodiment of the roll control system shown in FIG. 9 during a left turn of the vehicle.

Operation of the ARC system 120 during turns is illustrated in FIGS. 17B and 17C. A right turn is shown in FIG. 17B. As described above for FIG. 17A, the pump has been activated and the upper pair of digital valves 130b and 132b are energized; however, the pilot valve 154 also has been actuated. Accordingly, pressure is now applied through the directional valve 122 and port B to the upper ends of the cylinders while the lower ends of the cylinders are connected through the directional valve 122 to the reservoir 34. In response, the pistons contained in the cylinders are urged in a downward direction in FIG. 17B and thereby provide a counter-torque to the front and rear anti-roll bars, or torsion rods, 20 and 25. The amount of counter-torque is proportional to the displacement of the pistons which is a function of the pressure the fluid applied by the directional valve 122. The pressure is controlled by the proportional pilot valve 154 which is activated by the ECU in response to the signals generated by the vehicle sensors in response to the vehicle speed and lateral acceleration. Thus, the ARC system 120 can be calibrated to provide a desired leveling effect in response to the turning of the vehicle. A left turn is illustrated in FIG. 17C where the lower pair of digital valves 130a and 130b are energized to urge the spool 124 in the directional valve 122 in an upward direction in FIG. 17C. Accordingly, pressure is now applied to the through the directional valve 122 and port A to the lower ends of the cylinders while the upper ends of the cylinders are connected through the directional valve 122 to the reservoir 34. In response, the pistons contained in the cylinders are urged in a upward direction in FIG. 17C and thereby provide a counter-torque to the front and rear anti-roll bars, or torsion rods, 20 and 25 that is opposite to the counter-torque applied in FIG. 17B.

Figure 17D:
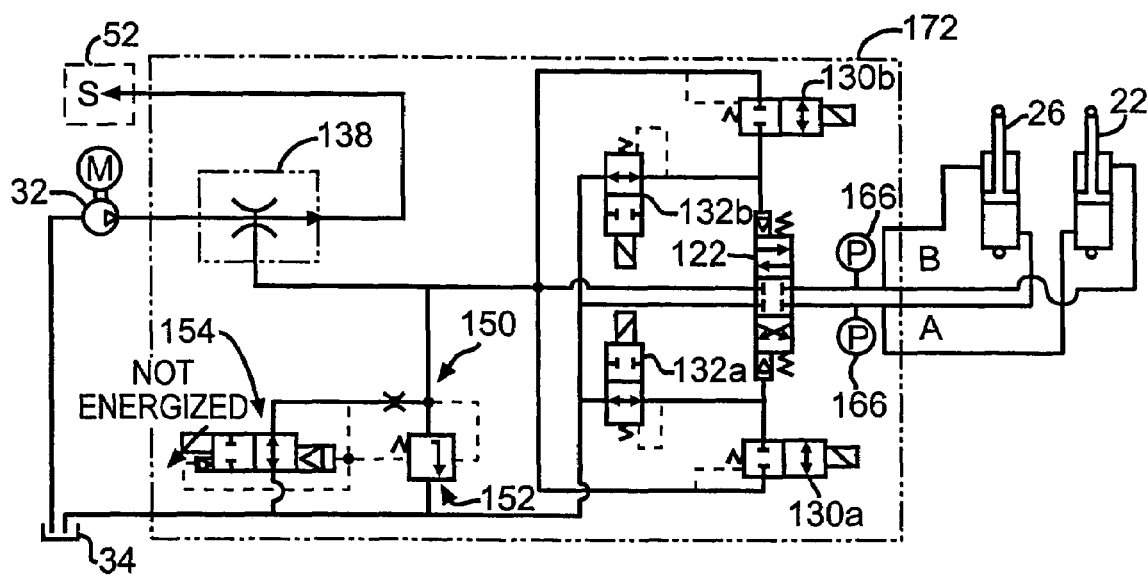
FIG. 17D is a fluid schematic drawing for an alternate embodiment of the roll control system shown in FIG. 9 during a power failure.

Should electrical power to the solenoid valves fail while the vehicle is running, the pump 32 will continue to supply pressurized fluid to the ARC system 120 and steering valve 52. However, the springs in the directional valve 122 will return the valve spool 124 to its center position, as shown in FIG. 17D. With the spool 124 centered, flow to and from the piston and cylinder assemblies 22 and 26 is blocked, locking the pistons in a stationary position within the cylinders for handling safety.

Figure 17E:
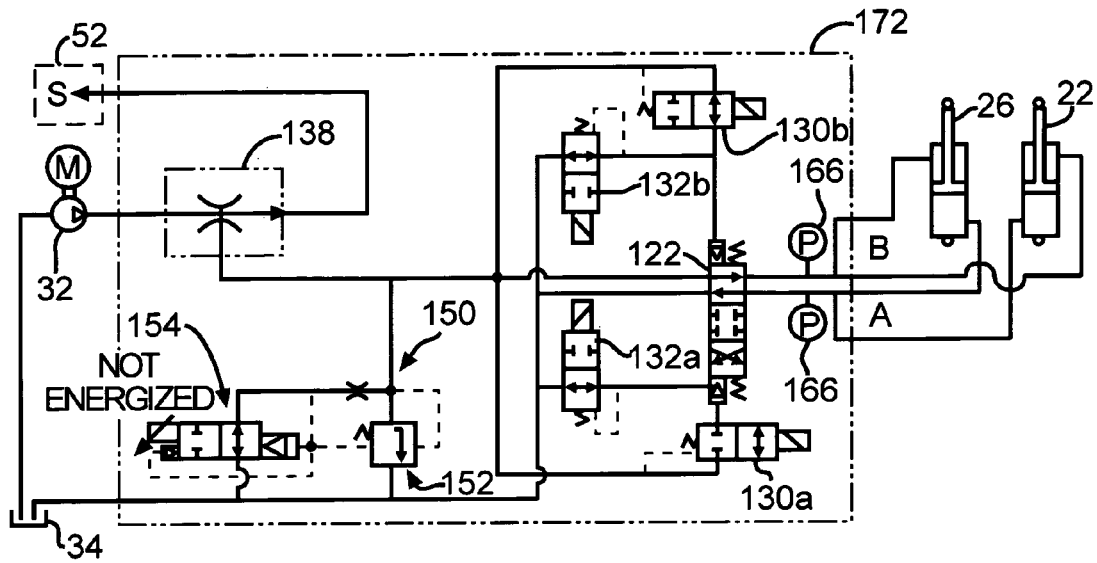
FIG. 17E is a fluid schematic drawing for an alternate embodiment of the roll control system shown in FIG. 9 during an evacuation and fill operation.

The invention also contemplates a evacuation and fill mode for removing air from the system 120 during the vehicle manufacturing process that is illustrated in FIG. 17E. A "detent" mechanism is provided for the directional valve that consists of the plunger 129 and two o-rings 180 in the plug 182 that captures the spool 124 within the directional valve body 184. The plunger 129 is shown at the right end of FIG. 10. At shipment, the plunger 129 is pushed in to actuate the directional valve 122. This allows one side of the actuator to be connected to the reservoir 34 for vacuum removal of air. The other side of the actuator is bled by either actuating one of the solenoids to connect the pressure line to the reservoir 34 or by adding a second detent mechanism in the valve body at the opposite end of the directional valve 122 for this purpose.

Figure 18:
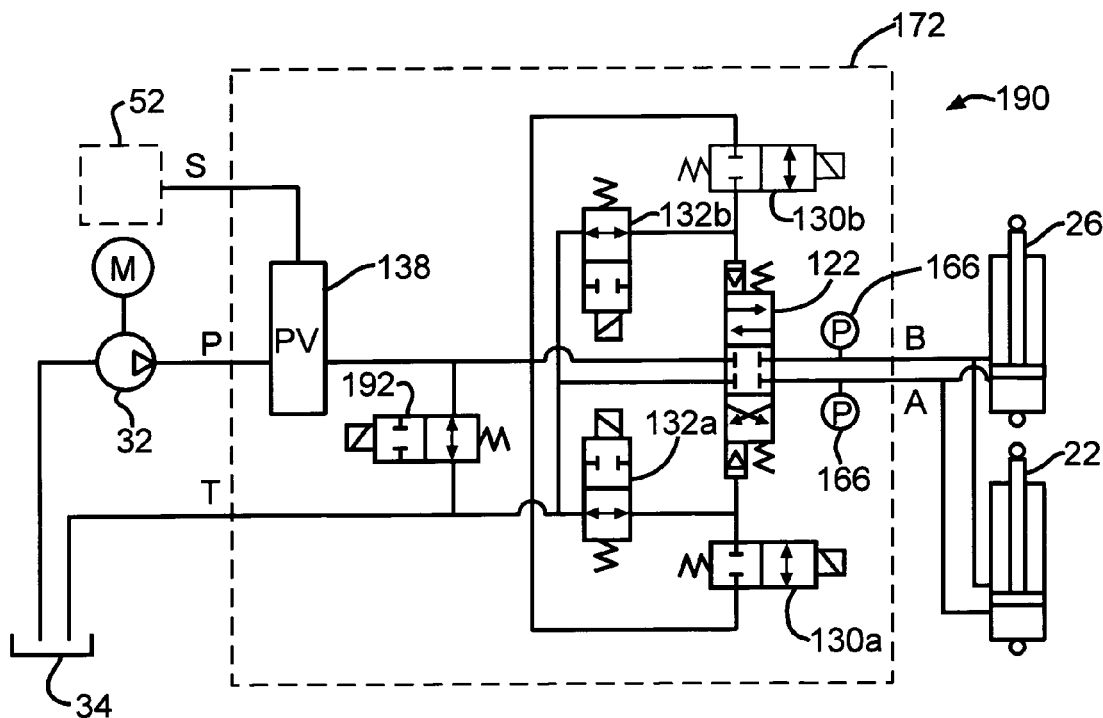
FIG. 18 is a fluid schematic drawing for another alternate embodiment of the roll control system shown in FIG. 3.

Another alternate embodiment 190 of the invention is illustrated in FIG. 18, where components that are similar to components shown in FIG. 9 have the same numerical designators. In FIG. 18, the pressure relief valve 150 shown in FIG. 9 has been replaced by a normally open digital bleed valve 192. The solenoid of bleed valve is periodically energized to restrict flow from the feed line 136 directly to the reservoir 34 which increases the pressure applied to the directional valve 122. In the preferred embodiment, a pulse width modulated voltage have a variable duty cycle is applied to the valve solenoid. By varying the duty cycle, the pressure of the fluid applies to the directional valve 122 is controlled. The operation of the other components shown in FIG. 18 is the same as described above for the ARC system 120.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope. For example the invention also can be practiced with first and third valves being normally closed valves while the second and fourth valves are normally open valves.

What is claimed is:

1. A control unit for a roll control system for a vehicle suspension system, the control unit comprising:

a valve body that is adapted to be connected to a roll control actuator device;

a plurality of valves mounted upon said valve body, said valves operable to control said roll control actuator device with at least one of said valves being a solenoid valve;

a housing removeably attached to said valve body;

a circuit substrate mounted within said housing, said circuit substrate carrying said electronic components, said electronic components operable to selectively actuate said valves;

at least one solenoid coil associated with said solenoid valve is carried by said circuit substrate, said solenoid coil being selectively energized by said electronic components to actuate said corresponding solenoid valve;

a hydraulically actuated three-position four-way valve mounted upon said valve body, said three-position four-way valve adapted to be connected said roll control actuator device and operable to selectively actuate said roll control actuator device to counter vehicle roll; and two pairs of digital solenoid valves mounted upon said valve body, each of said valve pairs including a normally open valve and a normally closed valve, each of said valve pairs associated with one position of said three-position four-way valve and selectively operable to supply pressurized hydraulic fluid to said three-position four-way valve to change the position thereof.

2. The control unit according to claim 1 further including a two stage pressure relief valve mounted upon said valve body, said pressure relief valve operable to control the pressure of hydraulic fluid supplied to said three-position four-way valve for operation of said roll control actuator device.

3. A control unit for a roll control system for a vehicle suspension system, the control unit comprising:

a valve body that is adapted to be connected to a roll control actuator device;

a plurality of valves mounted upon said valve body, said valves operable to control said roll control actuator device with at least one of said valves being a solenoid valve;

a housing removeably attached to said valve body;

a circuit substrate mounted within said housing, said circuit substrate carrying said electronic components, said electronic components operable to selectively actuate said valves;

at least one solenoid coil associated with said solenoid valve is carried by said circuit substrate, said solenoid coil being selectively energized by said electronic components to actuate said corresponding solenoid valve;

a three-position four-way valve mounted upon said valve body, said three-position four-way valve adapted to be connected said roll control actuator device and operable to selectively actuate said roll control actuator device to counter vehicle roll;

two pairs of digital solenoid valves mounted upon said valve body, each of said valve pairs including a normally open valve and a normally closed valve, each of said valve pairs associated with one position of said three-position four-way valve and selectively operable to change the position of said three-position four-way valve; and a two stage pressure relief valve mounted upon said valve body, said two stage pressure relief valve including a spool valve as a main stage and a balanced poppet solenoid valve, said spool valve communicating with said balanced poppet solenoid valve, said balanced poppet solenoid valve operable to control the flow of hydraulic fluid through said spool valve whereby the pressure of the hydraulic fluid supplied to said three-position four-way valve is controlled.

4. The control unit according to claim 3 further including a lateral accelerometer, said pressure relief valve being responsive to signals generated by said lateral accelerometer to control the pressure of the hydraulic fluid supplied to said three-position four-way valve for operation of said roll control actuator device as a function of vehicle lateral acceleration.

5. The control unit according to claim 3 further including a priority valve mounted upon said valve block, said priority valve adapted to be connected to a hydraulic fluid pump and operable to divide a flow of hydraulic fluid between a primary hydraulic circuit and said the pressure of hydraulic fluid supplied to said three-position four-way valve for operation of said roll control actuator device.

6. The control unit according to claim 5 wherein said hydraulic fluid pump is a power steering pump and further wherein said primary hydraulic circuit is a power steering system.

7. The control unit according to claim 4 further including an electrical connector mounted upon said housing, said connector adapted to provide an electrical connection between said electronic components and at least one sensor for the roll control system.

8. The control unit according to claim 4 wherein said electronic components include a microprocessor, said microprocessor electrically connected a plurality of vehicle sensors and responsive to signals generated by said sensors to selectively operate said valves mounted in said valve body to correct vehicle roll about a fore to aft axis.

9. The control unit according to claim 8 wherein said sensors include said lateral accelerometer and at least one wheel speed sensor and a steering angle detector.

10. The control unit according to claim 9 wherein said plurality of sensors includes at least one angular rate sensor.

11. A method for controlling the roll of a vehicle comprising the steps of:
(a) providing a roll control system that includes a valve body that is adapted to be connected to a roll control actuator device, the valve body having a hydraulically operated three-position four-way valve mounted upon thereon that is adapted to be connected a roll control actuator device and operable to selectively actuate the roll control actuator device to counter vehicle roll, the value body also including two pairs of digital solenoid valves mounted thereon with each of the valve pairs including a normally open valve and a normally closed valve, each of the valve pairs associated with one position of the three-position four-way valve and selectively operable to supply pressurized hydraulic fluid to the three-position four-way valve to chance the position of the three-position four-way valve, the roll control system further including a housing removeably attached to the valve body, the housing having electronic components disposed therein, the electronic components being electrically connected to at least one sensor for detecting roll of the vehicle about a fore to aft axis and also being operable to selectively actuate the digital solenoid valves;
(b) selectively actuating the valves upon detecting vehicle roll to counteract the vehicle roll; and
(c) deactuating the valves upon detecting that the vehicle roll has ended.

* * * * *

UNITED STATES PATENT AND TRADEMARK OFFICE
CERTIFICATE OF CORRECTION

PATENT NO. : 7,234,707 B2  Page 1 of 1
APPLICATION NO. : 11/000319
DATED : June 26, 2007
INVENTOR(S) : Steve J. Green et al.

It is certified that error appears in the above-identified patent and that said Letters Patent is hereby corrected as shown below:

Claim 11, in Column 16, Line 30, delete "chance" and insert --change--.

Signed and Sealed this

Fourteenth Day of August, 2007

JON W. DUDAS
*Director of the United States Patent and Trademark Office*